United States Patent
Fushimi

(10) Patent No.: US 10,496,592 B2
(45) Date of Patent: Dec. 3, 2019

(54) SYSTEM AND METHOD TO EFFECTIVELY OVERLAP COMPUTATION AND REDUCTION OPERATION OF NONBLOCKING COLLECTIVE COMMUNICATION

(71) Applicant: FUJITSU LIMITED, Kawasaki-shi, Kanagawa (JP)

(72) Inventor: Masaaki Fushimi, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 315 days.

(21) Appl. No.: 14/949,049

(22) Filed: Nov. 23, 2015

(65) Prior Publication Data
US 2016/0188340 A1 Jun. 30, 2016

(30) Foreign Application Priority Data
Dec. 26, 2014 (JP) .................. 2014-265205

(51) Int. Cl.
| | | |
|---|---|---|
| G06F 15/163 | (2006.01) | |
| G06F 15/76 | (2006.01) | |
| G06F 9/30 | (2018.01) | |
| G06F 9/46 | (2006.01) | |
| G06F 15/173 | (2006.01) | |

(52) U.S. Cl.
CPC .......... *G06F 15/163* (2013.01); *G06F 9/3004* (2013.01); *G06F 9/46* (2013.01); *G06F 15/17318* (2013.01); *G06F 15/76* (2013.01)

(58) Field of Classification Search
CPC ........ G06F 9/3004; G06F 9/3885; G06F 9/46; G06F 15/163; G06F 15/17318; G06F 15/17393
See application file for complete search history.

(56) References Cited

U.S. PATENT DOCUMENTS 4,845,744 A * 7/1989 DeBenedictis ... G06F 15/17343
379/88.22
5,224,100 A * 6/1993 Lee .................. G06F 15/17368
370/408
(Continued)

FOREIGN PATENT DOCUMENTS

JP 2006-277635 10/2006
JP 2012-252591 12/2012

*Primary Examiner* — David J. Huisman
(74) *Attorney, Agent, or Firm* — Staas & Halsey LLP

(57) ABSTRACT

A root-node is coupled to each of multiple leaf-nodes directly or via one or more relay-nodes in a hierarchical topology. A processor in a relay-node holds, in a queue, a first instruction storing first data obtained by performing a predetermined operation using second data received from downstream-nodes, which are directly coupled to the relay-node and positioned on a leaf-node side of the relay-node in the hierarchical topology. A downstream-node generates a second instruction including the second data held in the downstream-node, and transmits the generated second instruction to the relay-node. A network interface card of the relay-node performs the predetermined operation by using the first data stored in the first instruction in the queue, and the second data included in the second instruction. The root-node performs the predetermined operation by using a result of at least one relay-node directly coupled to the root-node and having performed the predetermined operation.

12 Claims, 18 Drawing Sheets

(56) References Cited

U.S. PATENT DOCUMENTS

| | | | | |
|---|---|---|---|---|
| 6,449,667 B1* | 9/2002 | Ganmukhi | ............. | G06F 11/08 |
| | | | | 370/408 |
| 8,161,480 B2* | 4/2012 | Archer | ................... | G06F 9/546 |
| | | | | 711/147 |
| 8,566,841 B2* | 10/2013 | Archer | ..................... | G06F 9/52 |
| | | | | 712/228 |
| 8,949,577 B2* | 2/2015 | Archer | .............. | G06F 15/17318 |
| | | | | 712/28 |
| 2003/0061417 A1* | 3/2003 | Craddock | ............... | G06F 9/546 |
| | | | | 710/54 |
| 2008/0104367 A1* | 5/2008 | Blumrich | ......... | G06F 15/17381 |
| | | | | 712/11 |
| 2009/0037377 A1* | 2/2009 | Archer | .............. | G06F 17/30445 |
| 2009/0292905 A1* | 11/2009 | Faraj | .................... | G06F 9/5061 |
| | | | | 712/225 |
| 2011/0119673 A1* | 5/2011 | Bloch | ................... | G06F 9/546 |
| | | | | 718/102 |
| 2012/0066483 A1* | 3/2012 | Boury | ................ | G06F 12/0875 |
| | | | | 712/233 |
| 2012/0144401 A1* | 6/2012 | Faraj | ........................ | G06F 9/54 |
| | | | | 719/313 |
| 2012/0331270 A1* | 12/2012 | Archer | ..................... | G06F 9/54 |
| | | | | 712/30 |

* cited by examiner

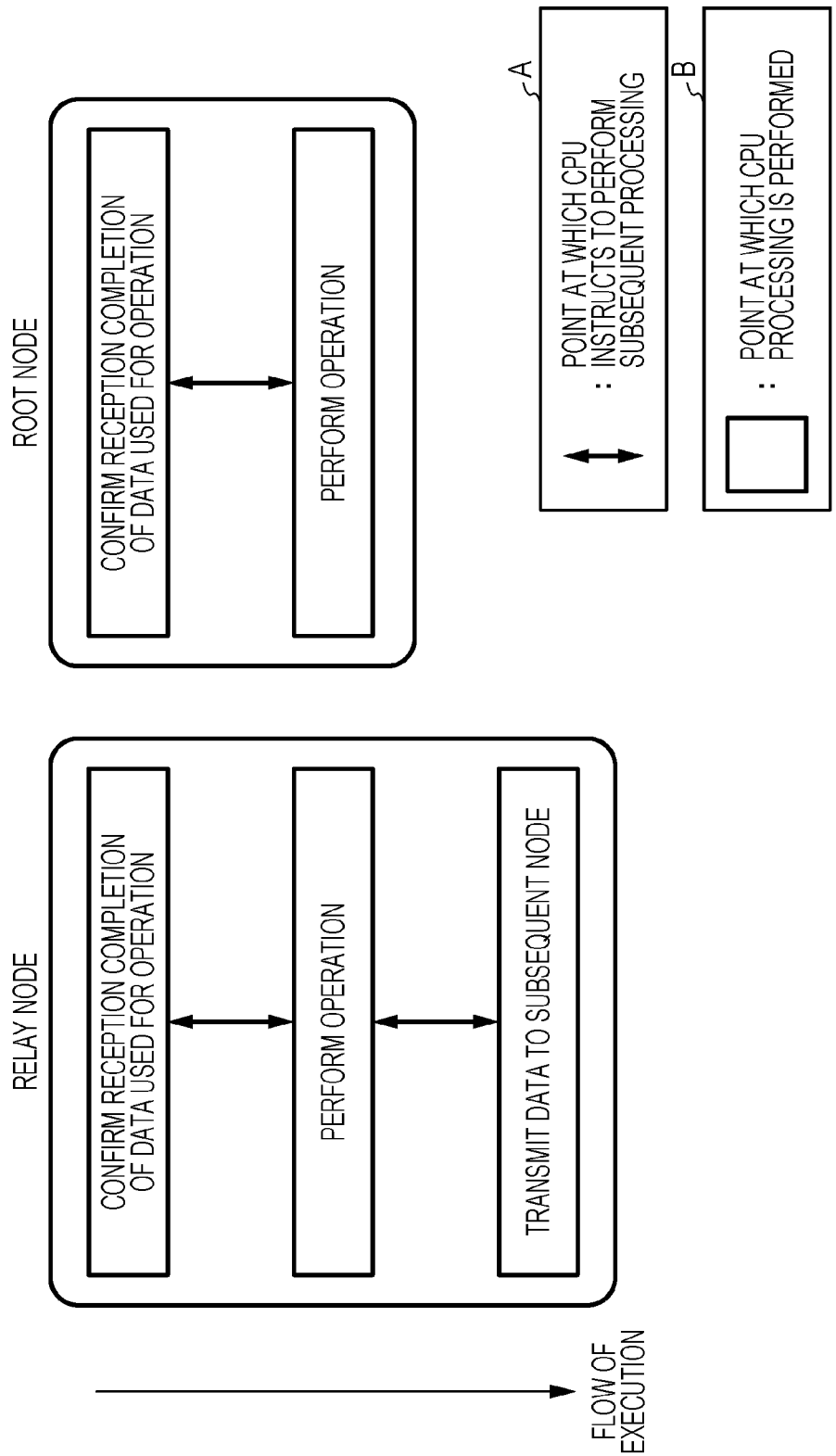

SYSTEM AND METHOD TO EFFECTIVELY OVERLAP COMPUTATION AND REDUCTION OPERATION OF NONBLOCKING COLLECTIVE COMMUNICATION

CROSS-REFERENCE TO RELATED APPLICATION

This application is based upon and claims the benefit of priority of the prior Japanese Patent Application No. 2014-265205, filed on Dec. 26, 2014, the entire contents of which are incorporated herein by reference.

FIELD

The embodiments discussed herein are related to a system and method for performing parallel operations using a plurality of nodes.

BACKGROUND

In a parallel computer (information processing) system in which a parallel operation is performed using nodes (information processing apparatuses), a communication library such as a message passing interface (MPI) is used in some cases. The communication library is a library for providing functions relating to communication of nodes, such as group communication for transmitting and receiving pieces of data between the nodes.

As one of examples of the group communication provided by the communication library, a reduction operation has been known. The reduction operation is an operation for aggregating, in one node (root node), results obtained by performing specific operations by using pieces of data included in nodes (leaf nodes).

The reduction operation has implementation forms. As one thereof, there is a method for aggregating, in a root node, results while obtaining, in relay nodes, intermediate results of operations, in such a manner as exemplified in FIG. 17. According to the method illustrated in FIG. 17, there is an advantage that even a large-scale system including a large number of nodes is able to suppress an increase in overall processing time, due to concentration of communication in the root node.

Note that, in the example in FIG. 17, leaf nodes A to D each transmit data to a root node R or one of relay nodes E to G (see a timing t1 and arrows (1)). The root node R or the relay nodes E to G each confirm reception completion of transmitted data and each perform a specified operation on the received data. When operations are completed, the relay node E transmits data thereof to the root node R, and the relay node G transmits data thereof to the subsequent relay node F (see a timing t2 and arrows (2)). In addition, after performing a specified operation on pieces of data received from the leaf node C and the relay node G, the relay node F transmits the pieces of data to the root node R (see a timing t3 and an arrow (3)).

In addition, as a method, based on MPI, for transmitting and receiving pieces of data, non-blocking communication has been known. In the non-blocking communication, a processor in a node returns from a communication function at the time of initiating communication processing. Therefore, it is possible to overlap another arithmetic processing operation with the relevant communication processing before communication is completed. In the non-blocking communication, the node that performs the communication processing confirms completion of the communication processing with proper timing.

By the way, as a technology for contributing to speeding up specific processing, there are an atomic read modify write (ARMW) operation and hardware offload.

The ARMW operation is an operation in which a series of processing operations are performed atomically (while ensuring atomicity). As an example of the series of processing operations, processing operations illustrated as follows are cited.

Reading data from a buffer area (memory area) of a remote node (Read),

Rewriting remote-side area data by performing a specific operation on the read data (remote-side area data) (Modify), and Writing rewritten data to the relevant buffer area (Write).

Data (local-side area data) included in a node (local node) serving as an issuing source of an instruction for an ARMW operation (ARMW instruction) may be used for the specific operation performed on the remote-side area data. As exemplified in FIG. 18, the local-side area data is directly described in the ARMW instruction and specified. Note that, in an example of the ARMW instruction illustrated in FIG. 18, the type of instruction is information relating to a series of processing operations to be performed by the relevant ARMW instruction, and address information of the remote-side area data is a value associated with, for example, an address of the remote-side area data serving as an operation target. In addition, the coordinates of the remote node are information relating to the location of the remote node within a system.

The hardware offload is a technology for reducing a CPU load by causing hardware, such as a network interface card (NIC), to perform processing, which is to be usually performed by a central processing unit (CPU). Note that it is possible to cause the hardware offload to include a function of performing the above-mentioned ARMW operation and a function of automatically transmitting, by using completion of a processing operation as a trigger, a preliminarily prepared specific instruction.

Technologies of the related art are disclosed in Japanese Laid-open Patent Publication No. 2006-277635 and Japanese Laid-open Patent Publication No. 2012-252591.

SUMMARY

According to an aspect of the invention, a system includes leaf nodes, one or more relay nodes and a root node. Each of the one or more relay nodes is configured to perform a first portion of a predetermined operation by using data of leaf nodes coupled to the relay node. The root node is coupled to each of the leaf nodes directly or via the one or more relay nodes in a hierarchical topology. The root node is configured to perform a second portion of the predetermined operation by using data of leaf nodes directly coupled to the root node and a result of at least one relay node, directly coupled to the root node, having performed the first portion of the predetermined operation. Each of the one or more relay nodes includes a processor configured to set, in a queue, a first instruction for transmitting a result of performing the first portion of the predetermined operation to an upstream node that is directly coupled to the relay node and positioned on a root-node side of the relay node in the hierarchical topology, before performing the first portion of the predetermined operation, where the first instruction is configured to store an intermediate result of performing the first portion of the predetermined operation. A downstream node, which is directly coupled to each of the one or more relay nodes and positioned on a leaf-node side of the relay node in the hierarchical topology, generates a second instruction that includes data held in the downstream node and is addressed to the relay node, and transmits the generated second instruction to the relay node. Each of the one or more relay nodes further includes a network interface card configured to perform the first portion of the predetermined operation by using data included in the second instruction received from the downstream node; and data included in the first instruction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 19 is a diagram illustrating an example of processing operations of a relay node and a root node that perform a reduction operation.

DESCRIPTION OF EMBODIMENTS

In a non-blocking reduction operation implemented via a relay node, the following points are performance bottlenecks.

Figure 17:
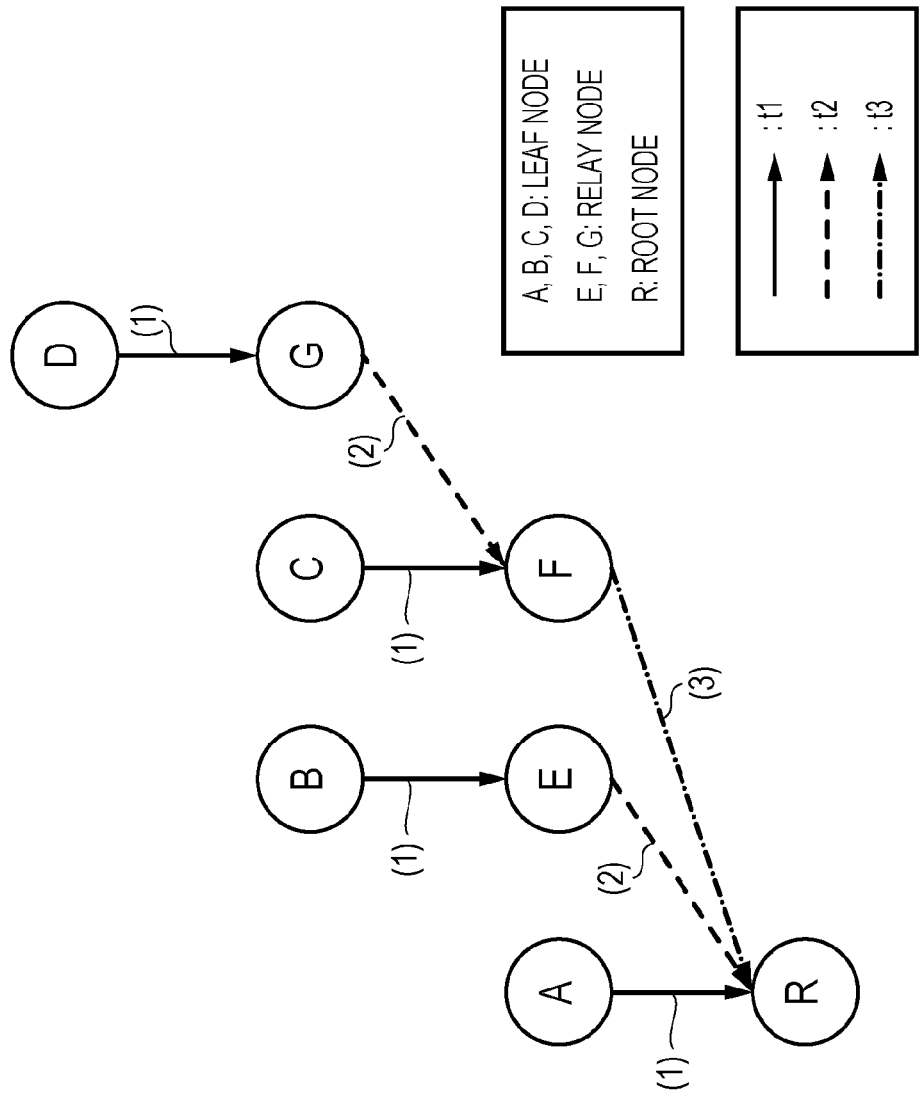
FIG. 17 is a diagram illustrating an example of a reduction operation that utilizes relay nodes in a parallel computer system.

As described with reference to FIG. 17, the following individual processing operations are performed in a relay node and a root node.

Relay Node
1. Confirm reception completion of data used for an operation
2. Perform the operation
3. Transmit data to a subsequent node Root Node
1. Confirm reception completion of data used for an operation
2. Perform the operation Between the first and second processing operations and between the second and third processing operations in the relay node and between the first and second processing operations in the root node (see arrows indicated by a symbol A in FIG. 19), individual CPUs instruct to perform subsequent processing operations. In this way, in a time interval of each of the arrows indicated by the symbol A in FIG. 19, the corresponding CPU is not released, and a performance overhead may occur in a parallel operation.

In addition, all the operations in each of the relay node and the root node (see individual boxes indicated by a symbol B in FIG. 19) are performed by processing in the CPUs. Accordingly, it is difficult for each of the CPUs to overlap other operations while these processing operations are performed, and overlap available time is restricted. Therefore, it is difficult to improve the performance of the parallel operation.

Therefore, it may be considered that the ARMW operation and the hardware offload, described above, are combined in the following manner, thereby achieving an improvement in performance.

(A) Processing operations from the reception completion of data to the operation are performed in a thrusting manner by using the ARMW operation, thereby reducing an overhead between the first and second processing operations in the relay node or the root node.

(B) By causing an NIC having a hardware offload function to have a function of performing an ARMW operation, CPU processing during the ARMW operation is avoided, thereby enabling the CPU to overlap another operation during the ARMW operation based on the NIC.

(C) The NIC in (B) is caused to have a function of reading and transmitting a subsequent instruction by using completion of specific processing as a trigger, thereby reducing an overhead between the second and third processing operations in the relay node.

Figure 18:
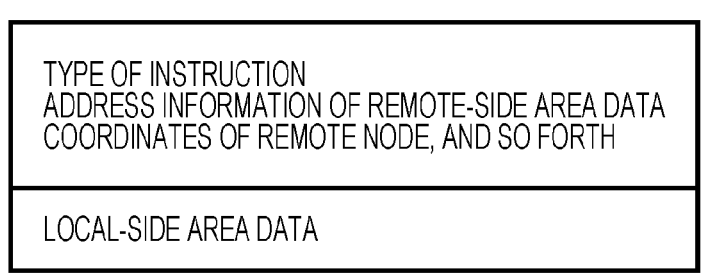
FIG. 18 is a diagram illustrating an example of an ARMW instruction.

However, the function of automatically transmitting a subsequent instruction, performed by the NIC, is difficult to combine with an ARMW operation utilized by a via-relay-node-based non-blocking reduction operation. The reason is that since only a preliminarily prepared instruction is able to be transmitted by the automatic transmission function, an ARMW instruction addressed to a subsequent node has to be set in an instruction queue in the relay node before an ARMW operation based on the NIC is initiated. In other words, as illustrated in FIG. 18, as for the ARMW instruction addressed to a subsequent node, data for an operation is described in the instruction itself. Therefore, the data for an operation has to be fixed at the time of creation of the ARMW instruction addressed to the subsequent node in the relay node, for example, at the time of setting thereof in the instruction queue. However, the data for an operation is first obtained in a process of the ARMW operation (completion of aggregate calculation) based on the NIC in the relevant relay node, and it is difficult to preliminarily set the data for an operation in the ARMW instruction before the initiation of the ARMW operation based on the NIC.

As described above, since it is difficult to combine the ARMW operation in the relay node and the automatic transmission function based on the NIC in the relay node, it is difficult to achieve an improvement in performance, based on the combination of all the above-mentioned (A) to (C).

In one aspect, an object of the present technology is to achieve an improvement in performance of a parallel operation in an information processing system including information processing apparatuses.

Hereinafter, embodiments of the present technology will be described with reference to drawings. In this regard, however, the embodiments described later are just exemplifications, and various modifications or applications of technologies, not explicitly illustrated below, are not intended to be excluded. In other words, the present embodiments may be variously modified and implemented without departing from the scope thereof. Note that, in drawings used in the following embodiments, a portion to which a same symbol is assigned indicates the same portion or a similar portion unless otherwise noted.

1 Embodiment

Figure 1:
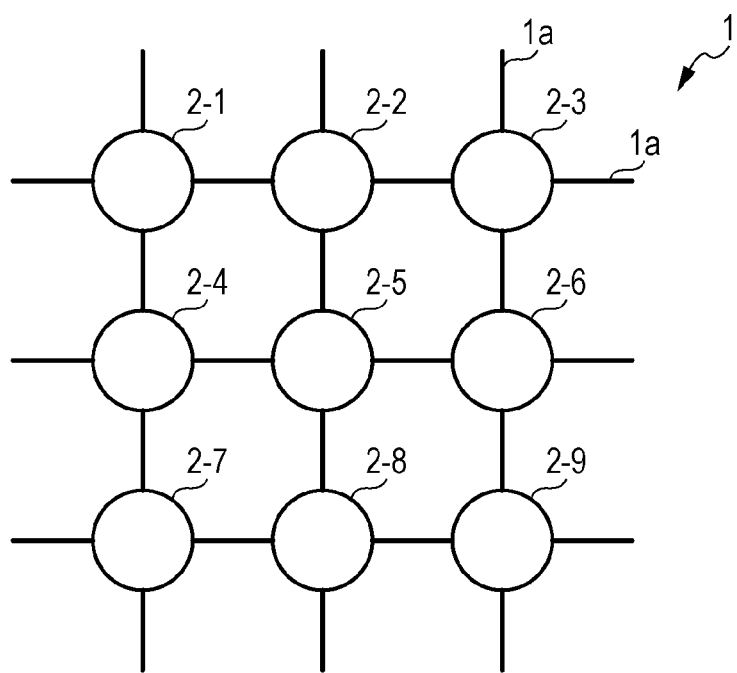
FIG. 1 is a diagram illustrating an example of a configuration of a parallel computer system, according to an embodiment.

FIG. 1 is a diagram illustrating an example of a configuration of a parallel computer system 1 serving as an example of an embodiment. As illustrated in FIG. 1, the parallel computer (information processing) system 1 includes nodes 2-1 to 2-9 (9 nodes in the example of FIG. 1) (simply called nodes 2 in a case where the nodes 2-1 to 2-9 are not discriminated in the following description).

The parallel computer system 1 is a system formed by connecting the nodes 2 via a network such as a bus is so that the nodes 2 are communicatable with one another. As the bus 1a, a metal cable or optical cable compliant with a high-speed bus architecture, such as Ethernet (registered trademark), InfiniBand, or Myrinet, may be cited.

Note that while, in the example of FIG. 1, in order to simplify a description, a small number (9) of nodes 2 are illustrated, the number of the nodes 2 included in the parallel computer system 1 is not limited to the scale of this number. In the large-scale parallel computer system 1, for example, several thousands to several tens thousands of nodes 2 or more nodes 2 may be included. In addition, in response to the number of nodes, the parallel computer system 1 may be realized by the nodes 2 within one enclosure or one rack, or may be a large-scale system in which racks each including nodes 2 are coupled. Furthermore, while, in the example of FIG. 1, it is assumed that the connection configuration of the nodes 2 is a two-dimensional mesh structure, a two-dimensional torus structure, a three-dimensional mesh or torus structure, a combination of these two-dimensional and three-dimensional mesh or torus structures, or the like may be adopted.

In addition, the parallel computer system 1 may be accessible by a user via a network, not illustrated. Using various kinds of known methods, such as a secure shell (SSH) and a teletype network (Telnet), a user terminal is able to access the parallel computer system 1, and to cause the nodes 2 to perform a user program.

Here, in addition to calculation nodes (a leaf node, a relay node, a root node, and so forth) that perform a reduction operation described later, the nodes 2 provided for the parallel computer system 1 may include a login node that instructs the calculation nodes to execute the user program. Entering the login node of the parallel computer system 1 by using, for example, an SSH connection and inputting therein a command for execution of the user program allows the user terminal to cause the login node to execute the user program. Alternatively, the user terminal may directly enter a calculation node and may cause the user program to be executed.

Note that various kinds of processing operations, such as preparation of communication data or buffers, calling of a non-blocking communication function, other operation processing, and calling of a completion confirmation function corresponding to the calling of the non-blocking communication function, may be included (described) in this user program. The details of these processing operations performed by the user program will be described later.

Figure 2:
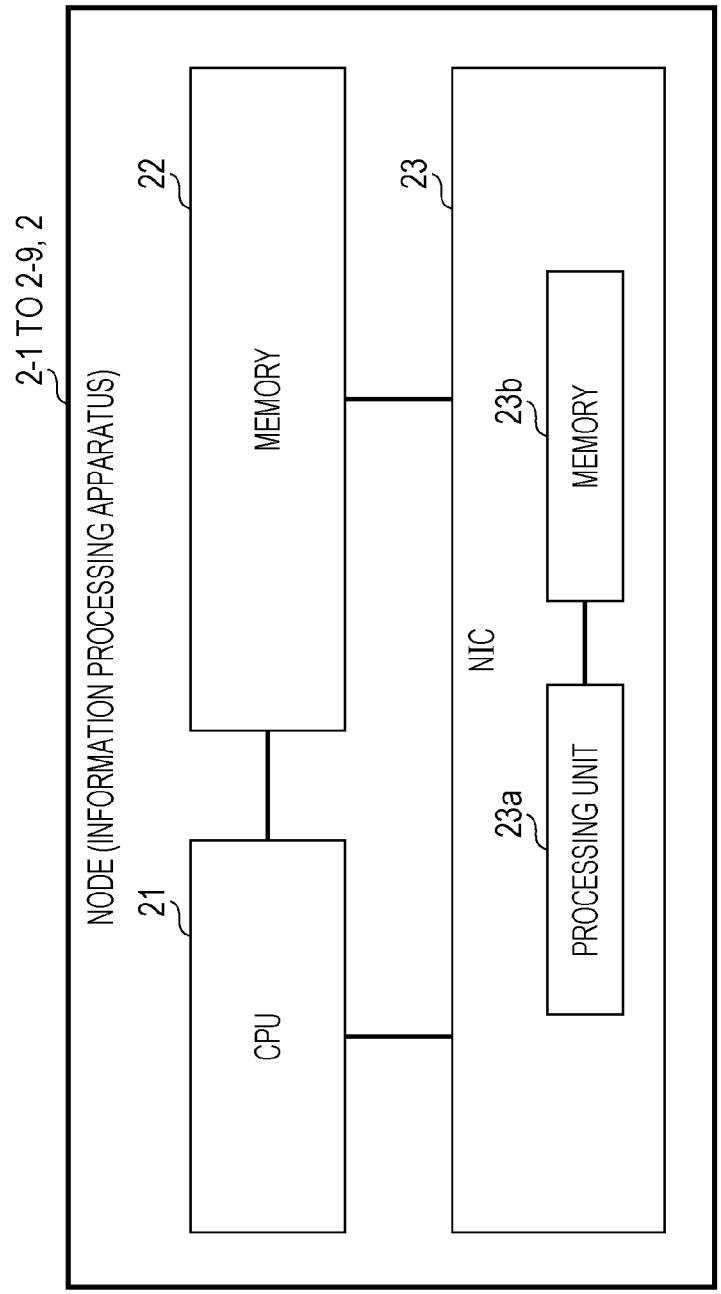
FIG. 2 is a diagram illustrating an example of a hardware configuration of a node, according to an embodiment.

FIG. 2 is a diagram illustrating an example of a hardware configuration of each of the nodes (information processing apparatuses) 2 illustrated in FIG. 1. As illustrated in FIG. 2, the nodes 2 each exemplarily include a CPU 21, a memory 22, and an NIC 23.

The CPU 21 is an example of an arithmetic processing apparatus (processor) that performs various control operations and various operations. The CPU 21 is connected to the memory 22 and the NIC 23, and is able to realize various functions by executing programs stored in the memory 22 or a storage apparatus, such as a read only memory (ROM), not illustrated.

The CPU 21 may use, for example, a communication library such as an MPI, stored in the memory 22, and may realize various kinds of communication, such as group communication of a reduction operation in the parallel computer system 1, in coordination with the other nodes 2.

For example, in the reduction operation, based on information for identifying (specifying) a root node and leaf nodes, which is set by a user of the parallel computer system 1, the CPU 21 determines relay nodes which are to be used in the reduction operation from the leaf nodes to the root node. The CPU 21 that performs this determination is a CPU 21 in an arbitrary node 2 out of the nodes 2, such as a CPU 21 in at least one node 2 out of the specified root node and leaf nodes. In addition, the CPU 21 in each of the leaf nodes stores data, used for an operation set by the user, in the memory 22, and initiates the reduction operation simultaneously with the CPUs 21 in the other leaf nodes.

Here, in one embodiment, the NICs 23 in the nodes 2 performing the reduction operation perform operations while serving as actors.

Therefore, in a preset phase for performing advance preparation for the reduction operation, the CPUs 21 in the nodes 2 each perform preliminary setting processing and so forth for the reduction operation on the individual nodes 2. On the other hand, in an operation phase for performing the reduction operation, the CPU 21 in each of the leaf nodes only has to instruct the NIC 23 to initiate the reduction operation. Note that the NIC 23 in each of the leaf nodes, instructed to initiate the reduction operation, transmits, to a subsequent node (a relay node or the root node), ARMW instruction data (including data for an operation) within the memory 22 of the leaf node.

Processing operations in the preset phase and the operation phase, performed by the CPU 21, will be described later.

The memory 22 is a storage apparatus that stores therein various data and various programs. At the time of executing a program, the CPU 21 stores and deploys data and the program in the memory 22. Note that, as the memory 22, a module that utilizes a random access memory (RAM), for example, a volatile memory such as a dynamic RAM (DRAM), may be cited.

The NIC 23 is a communication interface that performs control of connections, communication, and so forth, mainly based on wired lines, with other nodes 2. The NIC 23 includes ports compliant with, for example, a local area network (LAN), InfiniBand, or Myrinet, and is able to transmit and receive pieces of data (packets) to and from the other nodes 2 connected to ports via the bus 1a.

In addition, in the operation phase, the NIC 23 performs various processing operations including an ARMW operation based on hardware offload. By using the ARMW operation, the NIC 23 is able to perform a series of processing operations including, for example, transmission of data to a remote node, reception of data in the remote node, and performing of an operation in the remote node.

The whole or part of the above-mentioned functions of the NIC 23 may be realized by a processing unit 23a exemplified in FIG. 2. As the processing unit 23a, an arithmetic processing apparatus, such as a CPU or a micro processing unit (MPU), which performs firmware stored in the memory 23b, may be adopted. The memory 23b is a storage apparatus that stores therein firmware for realizing the functions of the NIC 23 in the operation phase. As the memory 23b, various nonvolatile memories, such as a ROM and a flash memory, may be cited.

Note that, in place of the arithmetic processing apparatus, logic circuits, for examples, various integrated circuits (ICs) such as an application specific integrated circuit (ASIC) and a field-programmable gate array (FPGA), may be used for the processing unit 23a. In this case, the memory 23b may be implemented in the relevant integrated circuits. As an example, the NIC 23 may be realized by a large scale integration (LSI) such as an interconnect controller (ICC), which performs control of interconnect in the corresponding node 2.

The above-mentioned hardware configuration of each of the nodes 2 is an exemplification, and a decrease or increase in hardware within the relevant node 2 (for example, addition or omission of an arbitrary block), division, integration based on arbitrary combination, and addition or omission of a bus may be arbitrarily performed.

1-1 Example of Configuration of Node

Next, an example of a configuration of each of the nodes 2 according to an embodiment will be described with reference to FIG. 3 to FIG. 9.

Figure 3:
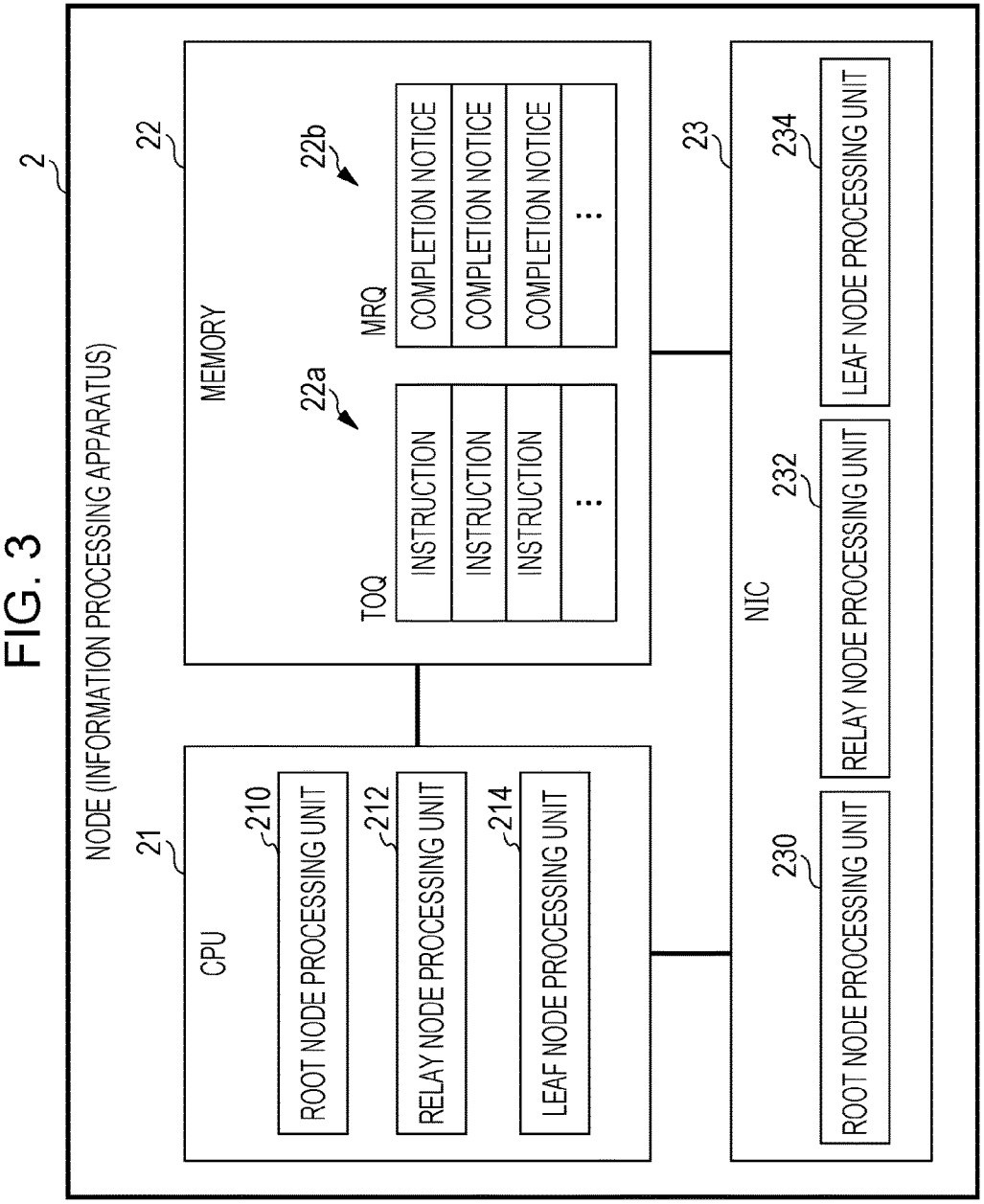
FIG. 3 is a diagram illustrating an example of a functional configuration of a node, according to an embodiment.

FIG. 3 is a diagram illustrating an example of a functional configuration of each of the nodes 2 illustrated in FIG. 1. The memory 22 in each of the nodes 2 is able to include, within the storage area thereof, a transmission order queue (TOQ) 22a and a message receive queue (MRQ) 22b. The TOQ 22a is a queue used for storing transmission instructions, and the MRQ 22b is a queue used for storing reception completion notices and so forth.

Note that the TOQ 22a may be set as a dedicated queue for storing ARMW instructions according to an embodiment. In addition, a plurality of TOQs 22a and a plurality of MRQs 22b may be provided (secured). Furthermore, a plurality of queues may be beforehand provided in the memory of the nodes 2, and at the time of performing the reduction operation, these queues may be used as the TOQs 22a and the MRQs 22b.

The CPU 21 and the NIC 23 in each of the nodes 2 each include a node processing unit performing the role of the node 2 (a root node, a relay node, or a leaf node) serving as a calculation node at the time of performing a non-blocking reduction operation.

The CPU 21 is configured to include, for example, a root node processing unit 210, a relay node processing unit 212, and a leaf node processing unit 214, and the NIC 23 is configured to include, for example, a root node processing unit 230, a relay node processing unit 232, and a leaf node processing unit 234. Since the role of the node 2 may be changed (is not fixed) in the parallel computer system 1, it is desirable that the CPU 21 and the NIC 23 in each of the nodes 2 include the functions of all these node processing units and each node 2 selects a node processing unit to be used in accordance with the role of the node 2.

Hereinafter, an operation of each of node processing units in a root node, a relay node, and a leaf node (hereinafter, these are represented by assigning symbols 2a, 2b, and 2c thereto) in each of the preset phase and the operation phase will be described.

Figure 4:
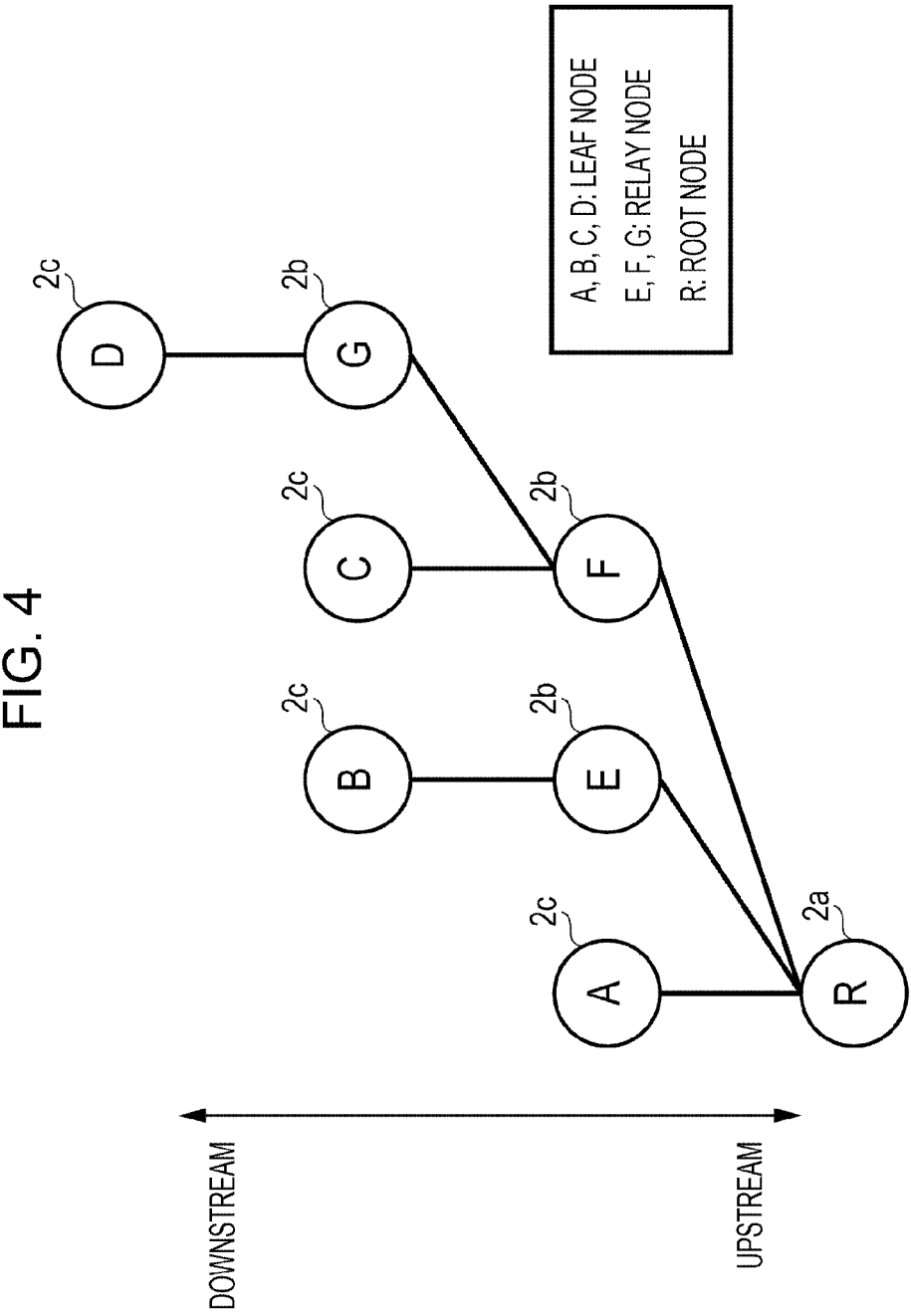
FIG. 4 is a diagram illustrating an example of a relationship between nodes in a reduction operation, according to an embodiment.

Note that, in the following description, it is assumed that the parallel computer system 1 that performs a reduction operation includes nodes 2 exemplified in FIG. 4. In FIG. 4, nodes A to D are leaf nodes 2c each including data, and nodes E to G are one or more relay nodes 2b that each perform a predetermined operation by using data of the corresponding leaf node 2c connected to the relay node 2b. In addition, a node R is a root node 2a that perform a predetermined operation by using data of the leaf node 2c connected to the node 2a and operation results of predetermined operations performed by the relay nodes 2b. Note that, in the nodes 2 that perform the reduction operation, it is assumed that a side on which a root node 2a is positioned is an upstream side and a side on which a leaf node 2c is positioned is a downstream side.

In the following description, it is assumed that the root node 2a, the leaf nodes 2c, and operation data set in each of the leaf nodes 2c are preliminarily specified by a user program that causes the parallel computer system 1 to perform a non-blocking reduction operation. In addition, the relay nodes 2b are selected from within the parallel computer system 1, illustrated in FIG. 1, by the root node 2a or the like.

1-1-1 Preset Phase

Figure 5:
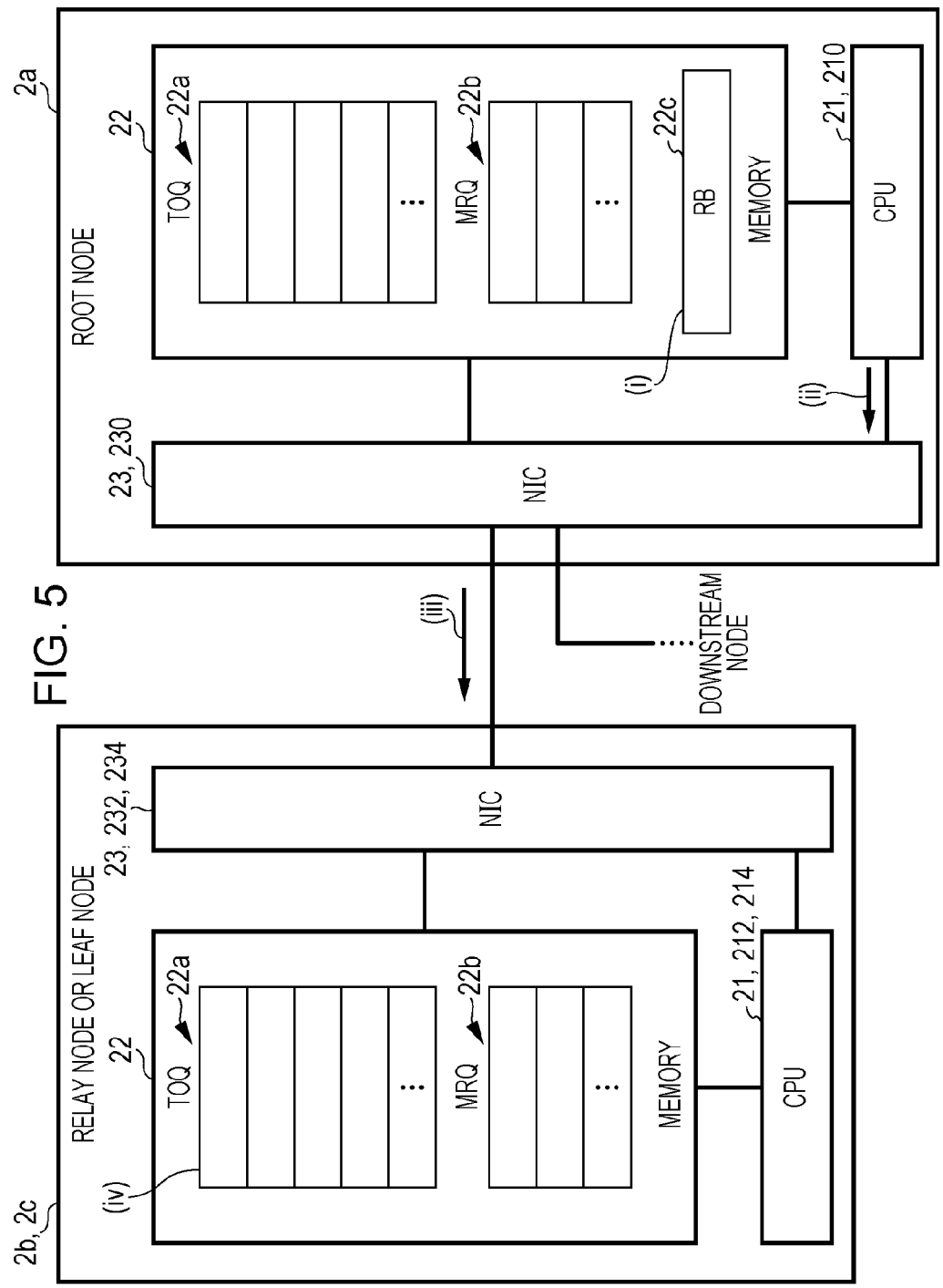
FIG. 5 is a diagram illustrating an example of operations of nodes in a preset phase, according to an embodiment.
Figure 6:
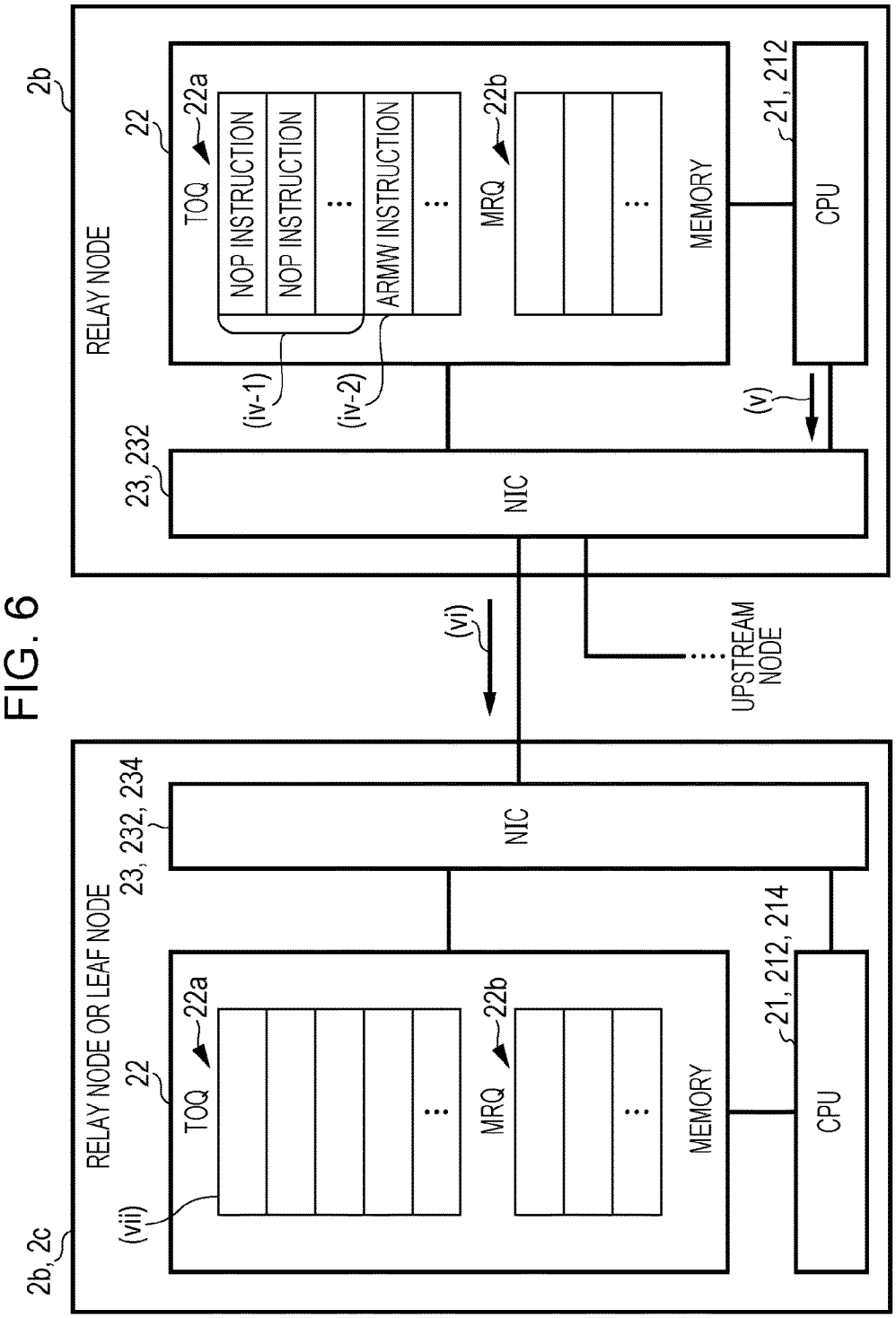
FIG. 6 is a diagram illustrating an example of operations of nodes in a preset phase, according to an embodiment.
Figure 7:
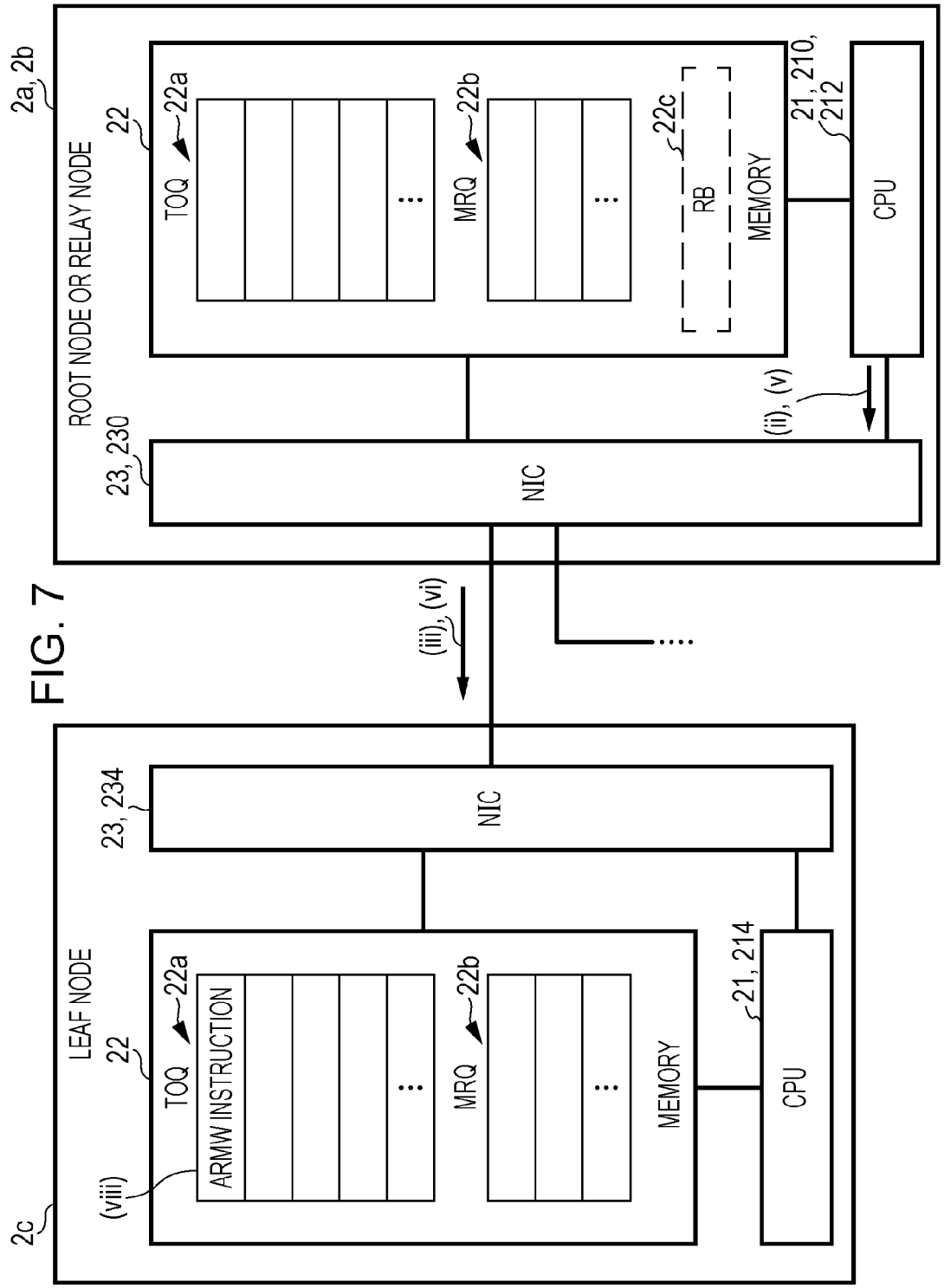
FIG. 7 is a diagram illustrating an example of operations of nodes in a preset phase, according to an embodiment.

Each of FIG. 5 to FIG. 7 is a diagram illustrating examples of operations of nodes 2 in the preset phase. In the preset phase, the root node 2a, the relay nodes 2b, and the leaf nodes 2c each perform the following operation.

Root Node 2a

In the presetting (initializing processing) of the reduction operation, the root node processing unit 210 in the CPU 21 in the root node 2a secures a random access buffer (RB) 22c on the memory 22 (see a symbol (i) in FIG. 5). The RB 22c is used as an aggregate calculation buffer for writing a reduction operation result.

In addition, the root node processing unit 210 instructs the NIC 23 to transmit an address of the aggregate calculation RB 22c to the downstream nodes 2 that directly perform communication with the node 2a, in other words, to the nodes 2 connected on the side of the leaf node 2c (see an arrow (ii) in FIG. 5).

In response to the instruction from the CPU 21, the root node processing unit 230 in the NIC 23 transmits information of the address of the RB 22c to the relay nodes 2b and the leaf node 2c, which directly perform communication with the node 2a (see an arrow (iii) in FIG. 5).

By the way, in non-blocking communication of the MPI, a user program calls a completion confirmation function in order to confirm completion after a non-blocking communication function is called. At this time, in order to identify non-blocking communication for which completion is to be confirmed, a "request" serving as identification information is used. In a case where, for example, the non-blocking communication function is called, the "request" is specified as one of arguments. Within a communication function, information for the "request", which includes, for example, the following pieces of information, is set.

A flag indicating whether or not this "request" is created on the root node 2a side in group communication, a flag indicating whether or not communication is completed, and the number of completion notices to be read from the message receive queue in order to confirm completion of the communication.

Therefore, at the time of the initializing processing of the non-blocking reduction operation, the root node processing unit 210 in the CPU 21 only has to set, as the information of the "request", the following values.

A root node flag of the group communication: TRUE, a memory communication completion flag: FALSE, and the number of completion notices to be read: the number of nodes that directly perform communication with the root node 2a.

Note that the root node processing unit 210 (the CPU 21) calls the non-blocking reduction operation function and returns to a calling source of the function when internal initializing processing is completed.

Relay Node 2b

In each of the relay nodes 2b that directly perform communication with the root node 2a, the relay node processing unit 212 in the CPU 21 creates an aggregate calculation ARMW instruction to be transmitted to the upstream node 2, in other words, the root node 2a, and sets the aggregate calculation ARMW instruction in the TOQ 22a (see a symbol (iv) in FIG. 5).

Specifically, the relay node processing unit 212 creates No Operation (NOP) instructions whose number is a number obtained by subtracting "1" from the number of nodes routed through the node 2b (the number of downstream nodes that directly perform communication with the node 2), and sets the NOP instructions in the TOQ 22a in the memory 22 (see a symbol (iv-1) in FIG. 6). In addition, the relay node processing unit 212 references the address transmitted in accordance with the arrows (ii) and (iii) in FIG. 5 by the root node 2a, and creates the aggregate calculation ARMW instruction whose target is the aggregate calculation RB 22c on the root node 2a. In addition, subsequent to the NOP instructions, the relay node processing unit 212 sets the created aggregate calculation ARMW instruction in the TOQ 22a (see a symbol (iv-2) in FIG. 6). The term "aggregate calculation ARMW instruction" is an ARMW instruction for performing aggregate calculation on results of ARMW operations (reduction operations) from the downstream leaf nodes 2c and transmitting the aggregated results to the corresponding upstream relay node 2b or the root node 2a. In other words, each of the nodes 2 that perform the aggregate calculation ARMW instructions aggregates a reduction operation result of a node 2 (leaf node 2c) located on a downstream side of the node 2, and outputs the aggregated reduction operation result to an upstream node 2.

Note that the term "NOP instruction" is an instruction that means performing no processing. In the hardware offload, at the time of utilizing a function of automatically transmitting a specific instruction, queuing plural NOP instructions before that instruction allows the specific instruction to be automatically transmitted after the plural NOP instructions are completed. In each of the relay nodes 2b according to an embodiment, using this mechanism, the NOP instructions whose number is "the number of nodes routed through the node 2b-1" and the aggregate calculation ARMW instruction are registered.

This allows each of the relay nodes 2b (the relay node processing unit 232 in the corresponding NIC 23) to transmit the aggregate calculation ARMW instruction registered subsequent to the NOP instructions, after the NOP instructions whose number is "the number of nodes routed through the node 2b-1" are completed.

Note that in a case where the number of nodes routed through the node 2b is "1", the relay node processing unit 212 may create only the aggregate calculation ARMW instruction without creating the NOP instructions.

Here, in the aggregate calculation ARMW instruction created in the symbol (iv-2) in FIG. 6, information of the root node 2a (information relating to the address of the RB 22c, and so forth) is set as information of a remote side. On the other hand, as described above, in the local-side area data (see FIG. 18), it is difficult to set, at this time point, a correct value used for an operation. Therefore, the relay node processing unit 232 sets temporary data (dummy data) as the local-side area data of the created aggregate calculation ARMW instruction. The temporary data is data that does not influence an operation result of the reduction operation and is determined in accordance with an operation content of the reduction operation. When the reduction operation is addition, the temporary data is, for example, "0". In addition, when the reduction operation is multiplication, the temporary data is, for example, "1".

In addition, the relay node processing unit 212 instructs the NIC 23 to transmit the address of the aggregate calculation ARMW instruction set in the TOQ 22a in the node 2b to the corresponding downstream node 2 (the corresponding relay node 2b or the corresponding leaf node 2c) that directly performs communication with the node 2b (see an arrow (v) in FIG. 6).

In response to the instruction from the CPU 21, the relay node processing unit 232 in the NIC 23 transmits information of the address of the aggregate calculation ARMW instruction to the corresponding relay node 2b or the corresponding leaf node 2c, which directly performs communication with the node 2b (see an arrow (vi) in FIG. 6).

Note that the relay node 2b that does not directly perform communication with the root node 2a basically performs the same operation as that of each of the relay nodes 2b that directly perform communication with the root node 2a. As for the relay node 2b that does not directly perform communication with the root node 2a (the node 2 on the left side of the plane of paper in the example of FIG. 6), a node 2 located on an upstream side of the relay node 2b is also one of the relay nodes 2b.

In a case of not directly performing communication with the root node 2a, the relay node processing unit 212 only has to reference the address of an aggregate calculation ARMW instruction of the corresponding upstream relay node 2b, transmitted by the relevant upstream relay node 2b in accordance with the arrow (vi) in FIG. 6, and to create an aggregate calculation ARMW instruction whose target is the aggregate calculation ARMW instruction whose address has been referenced. In the TOQ 22a at this time (see a symbol (vii) in FIG. 6), the aggregate calculation ARMW instruction is set subsequent to "0" or more NOP instructions, in such a manner as the TOQ 22a in the relay node 2b on the right side of the plane of paper in FIG. 6.

Note that in a case where one of the relay nodes 2b creates an aggregate calculation ARMW instruction whose target is the aggregate calculation ARMW instruction of the corresponding upstream relay node 2b, temporary data is set in the local-side area data of the created aggregate calculation ARMW instruction.

Here, at the time of the initializing processing of the non-blocking reduction operation, the relay node processing unit 212 in the CPU 21 does not have to create the information of the "request". The reason is that the user program only has to confirm completion in the root node 2a and the leaf nodes 2c.

Note that the relay node processing unit 212 (CPU 21) calls the non-blocking reduction operation function and returns to a calling source of the function when internal initializing processing is completed.

As described above, the CPU 21 in each of the relay nodes 2b is an example of a processor that sets a predetermined instruction, used for transmitting an operation result to the corresponding upstream node 2, in the TOQ 22a before performing of a predetermined operation in the relevant relay node 2b.

Leaf Node 2c

In each of the leaf nodes 2c, the leaf node processing unit 214 in the CPU 21 creates an ARMW instruction to be transmitted to the corresponding upstream node 2 (the root node 2a or the corresponding relay node 2b) and sets the ARMW instruction in the TOQ 22a (see the symbol (iv) in FIG. 5, the symbol (vii) in FIG. 6, and a symbol (viii) in FIG. 7).

Specifically, in the leaf node 2c that directly performs communication with the root node 2a, the leaf node processing unit 214 references the address transmitted by the root node 2a in accordance with the arrows (ii) and (iii) in FIG. 5 and creates an ARMW instruction whose target is the aggregate calculation RB 22c on the root node 2a. In addition, the leaf node processing unit 214 sets the created ARMW instruction in the TOQ 22a (see the symbol (iv) in FIG. 5 and the symbol (viii) in FIG. 7).

On the other hand, in each of the leaf nodes 2c that each directly perform communication with the corresponding relay node 2b, the leaf node processing unit 214 references the address transmitted by the corresponding relay node 2b in accordance with the arrows (v) and (vi) in FIG. 6 and creates an ARMW instruction for rewriting an aggregate calculation ARMW instruction on the corresponding relay node 2b. In addition, the leaf node processing unit 214 sets the created ARMW instruction in the TOQ 22a (see the symbol (vii) in FIG. 6 and the symbol (viii) in FIG. 7).

Note that, in the ARMW instruction created in the symbol (viii) in FIG. 7, information of the root node 2a (information relating to the address of the RB 22c) or information of the corresponding relay node 2b (information relating to the address of the aggregate calculation ARMW instruction, or the like) is set as information of a remote side. In addition, in the local-side area data (see FIG. 18), data for an operation, which is to be allocated to the node 2c in the reduction operation, is set. This data for an operation may be set in the memory 22 in the corresponding leaf node 2c in a case where the root node 2a and the leaf nodes 2c are preliminarily identified (specified) by a user of the parallel computer system 1. Alternatively, the data for an operation may be received by the corresponding leaf node 2c via the root node 2a (and the corresponding relay node 2b) in a process of initializing processing of the reduction operation.

Here, at the time of initializing processing of the non-blocking reduction operation, the leaf node processing unit 214 in the CPU 21 only has to set the following values as the information of the "request".

A root node flag of group communication: FALSE,
a memory communication completion flag: FALSE, and
the number of completion notices to be read: 1.

From the above, processing in the preset phase, performed by the root node 2a, the relay nodes 2b, and the leaf nodes 2c, finishes.

1-1-2 Operation Phase

Figure 8:
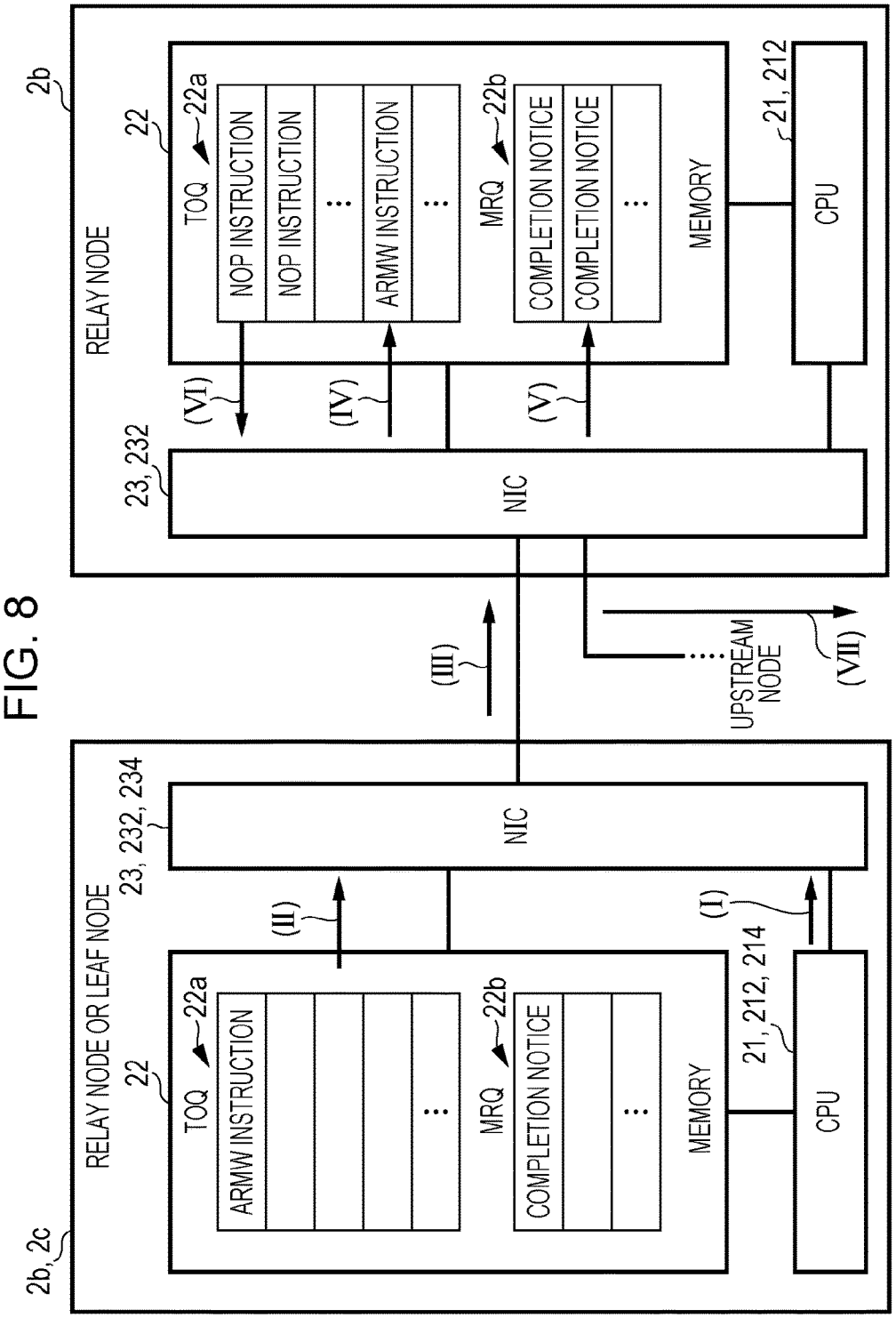
FIG. 8 is a diagram illustrating an example of operations of nodes in an operation phase, according to an embodiment.
Figure 9:
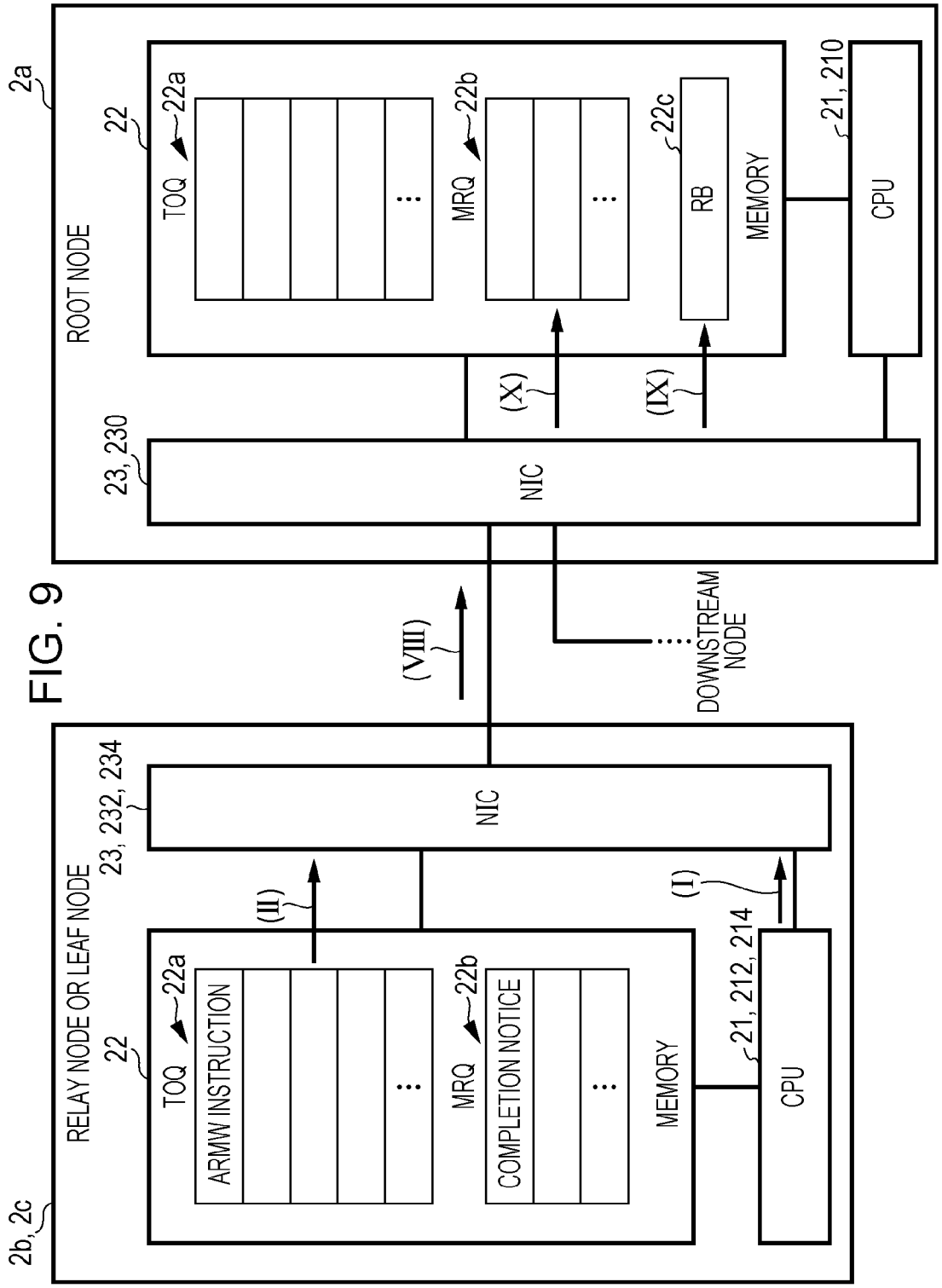
FIG. 9 is a diagram illustrating an example of operations of nodes in an operation phase, according to an embodiment.

FIG. 8 and FIG. 9 are diagrams each illustrating examples of operations of nodes 2 in the operation phase. In the operation phase, the root node 2a, the relay nodes 2b, and the leaf nodes 2c each perform the following operation.

Leaf Node 2c

When processing operations of the leaf nodes 2c are completed in the preset phase, the operation phase starts. In the operation phase, the CPU 21 (the leaf node processing unit 214) in each of the leaf nodes 2c instructs the NIC 23 to read the TOQ 22a (see arrows (I) in FIG. 8 and FIG. 9). Note that subsequent processing in the operation phase in the parallel computer system 1 is performed by the NICs 23 until a final reduction operation result is written to the RB 22c in the root node 2a.

In response to the instruction from the CPU 21, the leaf node processing unit 234 in the NIC 23 reads an ARMW instruction from a position indicated by a read pointer of the TOQ 22a (for example, the beginning of the TOQ 22a) (see arrows (II) in FIG. 8 and FIG. 9). In addition, the leaf node processing unit 234 transmits the read ARMW instruction to the corresponding upstream node 2 (the corresponding relay node 2b or the root node 2a) (see an arrow (III) in FIG. 8 and an arrow (VIII) in FIG. 9).

Note that the leaf node processing unit 214 (the CPU 21) calls the non-blocking reduction operation function. In addition, after internal initializing processing is completed, the leaf node processing unit 214 (the CPU 21) returns to a calling source of the function when transmission of the ARMW instruction serving as the starting point of the operation phase is completed.

As described above, the CPU 21 (the leaf node processing unit 214) in each of the leaf nodes 2c generates an instruction, which includes data included in the relevant leaf node 2c and which is addressed to the corresponding relay node 2b, and transmits the generated instruction to the corresponding relay node 2b.

Relay Node 2b

Upon receiving an ARMW instruction whose target is each of the relay nodes 2b from the corresponding downstream node 2 (the corresponding relay node 2b or the corresponding leaf node 2c), the NIC 23 (the relay node processing unit 232) in each of the relay nodes 2b rewrites, based on an ARMW operation, an aggregate calculation ARMW instruction specified by the ARMW instruction (see an arrow (IV) in FIG. 8).

Specifically, the relay node processing unit 232 reads the local-side area data (data for an operation) in the aggregate calculation ARMW instruction which is queuing within the TOQ 22a in the node 2b and specified by the received ARMW instruction. In addition, the relay node processing unit 232 performs, on the read data for an operation, a predetermined operation that utilizes data for an operation, described in the received ARMW instruction. In addition, by writing an operation result in the aggregate calculation ARMW instruction within the TOQ 22a, the relay node processing unit 232 completes the ARMW operation.

When the ARMW operation is completed, the relay node processing unit 232 sets (registers) a completion notice in the MRQ 22b (see an arrow (V) in FIG. 8). Note that information for identifying the type of communication, such as a value for identifying processing relating to the completion notice, may be set in the completion notice.

In addition, upon setting the completion notice in the MRQ 22b, the relay node processing unit 232 reads an instruction from the TOQ 22a and performs processing corresponding to the read instruction (see an arrow (VI) in FIG. 8). Note that the read position of the TOQ 22a is specified by a pointer.

The instruction read from the TOQ 22a by the relay node processing unit 232 at this time is the NOP instruction except when a final aggregate calculation ARMW operation is completed, and no processing is performed via the arrow (VI) until an ARMW operation from the final node 2 out of the nodes 2 routed through the node 2b is completed.

On the other hand, in a case where the final ARMW operation is completed, the read pointer of the TOQ 22a indicates the aggregate calculation ARMW instruction. At this time, the relay node processing unit 232 reads the aggregate calculation ARMW instruction from the TOQ 22a and transmits the read aggregate calculation ARMW instruction to the corresponding upstream node 2 (see an arrow (VII) in FIG. 8). Accordingly, in a case where completion notices of ARMW operations requested by all the leaf nodes 2c that utilize the relevant relay node 2b are stacked in the MRQ 22b, the NIC 23 in the relevant relay node 2b reads and transmits the aggregate calculation ARMW instruction from the TOQ 22a to the corresponding upstream node 2.

In this way, the NIC 23 in each of the relay nodes 2b may be an example of an interface unit that performs, based on data included in an instruction (an ARMW instruction) received from the corresponding leaf node 2c, a predetermined operation on an operation result included in a predetermined instruction (an aggregate calculation ARMW instruction). At this time, in accordance with the instruction (the ARMW instruction) received from the corresponding leaf node 2c, the NIC 23 performs the ARMW operation on the aggregate calculation ARMW instruction within the TOQ 22a.

In addition, the NIC 23 serving as an example of this interface unit suspends transmission of instructions stored in the TOQ 22a until ARMW operations from all the nodes 2 connected on a downstream side of the node 2b are completed. In addition, using completion of all the ARMW operations as a trigger, the NIC 23 serving as an example of this interface unit reads and transmits suspended instructions to the corresponding upstream node 2.

Root Node 2a

Upon receiving, from the corresponding downstream node 2 (the corresponding relay node 2b or the corresponding leaf node 2c), an ARMW instruction whose target is the root node 2a, the NIC 23 (the root node processing unit 230) in the root node 2a rewrites the RB 22c, based on an ARMW operation (see an arrow (IX) in FIG. 9).

Specifically, the root node processing unit 230 of a root node 2a reads data for an operation in the RB 22c in the node 2a, specified by the received ARMW instruction. In addition, the root node processing unit 230 performs, on the read data for an operation, a predetermined operation that utilizes data for an operation, described in the received ARMW instruction. The root node processing unit 230 completes the ARMW operation by writing an operation result in the RB 22c.

Note that since the root node 2a does not have to transmit an instruction to the subsequent node 2 after completion of processing, it is possible to define, in the same way as a general ARMW operation, the RB 22c in the root node 2a as a rewrite target area of the ARMW operation.

When the ARMW operation is completed, the root node processing unit 230 sets (registers) a completion notice in the MRQ 22b (see an arrow (X) in FIG. 9).

From the above, processing in the operation phase, based on the root node 2a, the relay nodes 2b, and the leaf nodes 2c, finishes.

1-1-3 Completion Confirmation Processing

Next, completion confirmation processing of a non-blocking reduction operation in the parallel computer system 1 will be described.

Completion confirmation of non-blocking communication of the MPI is performed using a completion confirmation function. At the time of calling the completion confirmation function, each of the nodes 2 (the root node 2a and the leaf nodes 2c, specified by a user program) specifies, as one of arguments, the "request" specified at the time of calling a non-blocking communication function as a completion confirmation target.

As described above, information for identifying the type of communication is included in a completion notice registered in the MRQ 22b. Therefore, in the completion confirmation function, respective confirmation processing operations corresponding to a root node 2a side and a leaf node 2c side are performed based on information included in the "request" and information included in the completion notice.

When a user program calls the completion confirmation function in order to confirm completion of the relevant operation, the following individual processing operations are performed in the root node 2a and the leaf nodes 2c of the reduction operation. Note that, at the time of calling the completion confirmation function, the user program specifies, as one of arguments, the "request" specified at the time of calling the non-blocking reduction operation function.

Processing on the root node 2a side is completed when a final result of the reduction operation is written to the RB 22c in the root node 2a, in other words, when completion notices whose number is the number of ARMW operations requested from the root node 2a are registered in the MRQ 22b. Therefore, as for completion confirmation on the root node 2a side, the CPU 21 confirms whether or not a predetermined number of completion notices are registered in the MRQ 22b.

The CPU 21 in the root node 2a is able to perform completion confirmation in accordance with, for example, the following procedures.

(1) Confirm a value of a root node flag in group communication, and in a case of TRUE, perform processing operations in and subsequent to (2).

(2) Read a completion notice from the MRQ 22b.

(3) In a case where being a completion notice relating to the non-blocking reduction operation is identified from information included in the read completion notice, subtract "1" from "the number of completion notices to be read" recorded within the "request".

(4) When, as a result of the processing operation in (3), the number of completion notices to be read becomes "0", set the value of a communication completion flag at TRUE and return to a calling source of the function. On the other hand, when the number of completion notices to be read is a value other than "0", return to (2).

On the other hand, in a case where, as described above, the initializing processing in the preset phase is completed and transmission of ARMW instructions in the operation phase is completed, the leaf node 2c side returns to a calling source of the function. At this time, processing on the leaf node 2c side is completed. Therefore, within the completion confirmation function, the CPU 21 only has to set the communication completion flag of the "request" at TRUE in accordance with the following procedures.

(5) Confirm the value of the root node flag in the group communication, and in a case of FALSE, perform a processing operation in (6).

(6) Set the value of the communication completion flag at TRUE and return to a calling source of the function.

From the above processing, the completion confirmation processing of the reduction operation is completed, and by confirming completion of the reduction operation, the user program is able to obtain a processing result of the reduction operation from the RB 22c in the root node 2a.

Note that in a case where it is difficult to confirm completion of the reduction operation (the reduction operation is not completed), the CPU 21 may return to a calling source of the function and call the completion confirmation function again at a predetermined timing after the elapse of a predetermined time period or may perform the completion confirmation again at a predetermined timing without returning. In addition, the completion confirmation performed by the CPU 21 in the root node 2a may be performed after the communication completion flags are determined as TRUE in completion confirmation performed by the CPUs 21 in all the leaf nodes 2c.

As described above, in the parallel computer system 1 according to an embodiment, when an entire operation in the corresponding relay node 2b is completed, an aggregate calculation ARMW instruction, which has incomplete data registered in the TOQ 22a in the relevant relay node 2b in the preset phase, is put into a state of having correct data to be used in the subsequent (corresponding upstream) node 2. Accordingly, it is possible to combine, with a function of automatically transmitting an instruction based on the NIC 23, an ARMW operation to use data after an operation on the corresponding relay node 2b.

From this, after the CPUs 21 in the leaf nodes 2c transmit ARMW instructions in a via-relay-node-2b-implemented non-blocking reduction operation, it is possible to obtain an operation result by using only processing operations based on the NICs 23 without involving the CPUs 21 in all the nodes 2 relating to the reduction operation. Accordingly, an overhead of processing, due to involving the CPUs 21, is reduced, and it is possible to increase the percentage of time periods during which overlaps with other operations based on the CPUs 21 are available.

As the scale of the parallel computer system 1 increases, speeding up in units of operations becomes important for improving execution performance. Based on the above-mentioned configuration according to an embodiment, it is possible to avoid concentration of loads on the CPUs 21 relating to the reduction operation, in particular, the CPUs 21 in the relay node 2b, and it is possible to implement a more efficient reduction operation utilizing the function of hardware. Therefore, it is possible to achieve an improvement in the execution performance of an application.

1-2 Example of Operation

Next, an example of an operation of the parallel computer system 1 configured as described above will be described with reference to FIG. 10 to FIG. 16.

Figure 10:
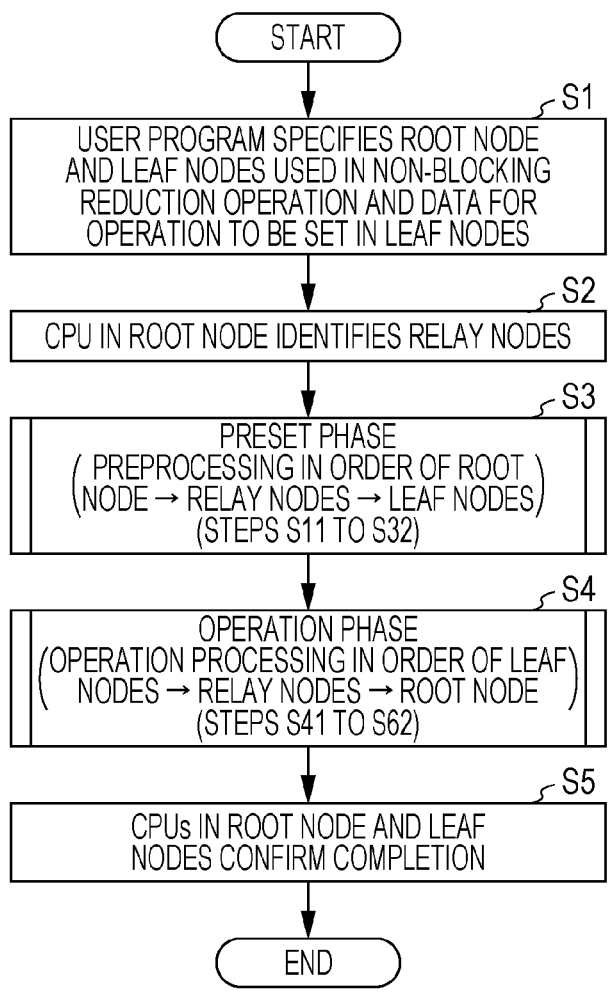
FIG. 10 is a diagram illustrating an example of an operational flowchart for a parallel computer system, according to an embodiment.

First, whole processing based on the parallel computer system 1 will be described with reference to FIG. 10. First, in one of the nodes 2 in the parallel computer system 1, a user program is executed, and a non-blocking reduction operation routed through the relay nodes 2b is initiated. At this time, the root node 2a and the leaf nodes 2c of the reduction operation and data for an operation to be set in the leaf nodes 2c are specified (step S1).

Next, the CPU 21 in the root node 2a identifies (selects) the relay nodes 2b to be used in the reduction operation, from among the nodes 2 in the parallel computer system 1 (step S2).

Next, the preset phase for performing preprocessing (pre-setting) in the order of the root node 2a, the relay nodes 2b, and the leaf nodes 2c is started (step S3: steps S11 to S32).

When the preset phase is completed, the operation phase for performing the reduction operation in the order of the leaf nodes 2c, the relay nodes 2b, and the root node 2a is started (step S4: step S41 to S62).

In addition, in each of the root node 2a and the leaf nodes 2c, the completion confirmation function is called, and the presence or absence of completion of the reduction operation is confirmed based on information of the "request". When, based on the completion of the operation phase, the CPU 21 in the root node 2a confirms completion of the reduction operation (step S5), the processing is terminated. From this, by referencing the RB 22c in the root node 2a, it is possible for a user to acquire a result of the reduction operation.

Next, processing operations of the root node 2a, the relay nodes 2b, and the leaf nodes 2c in the preset phase will be described with reference to FIG. 11 to FIG. 13.

Figure 11:
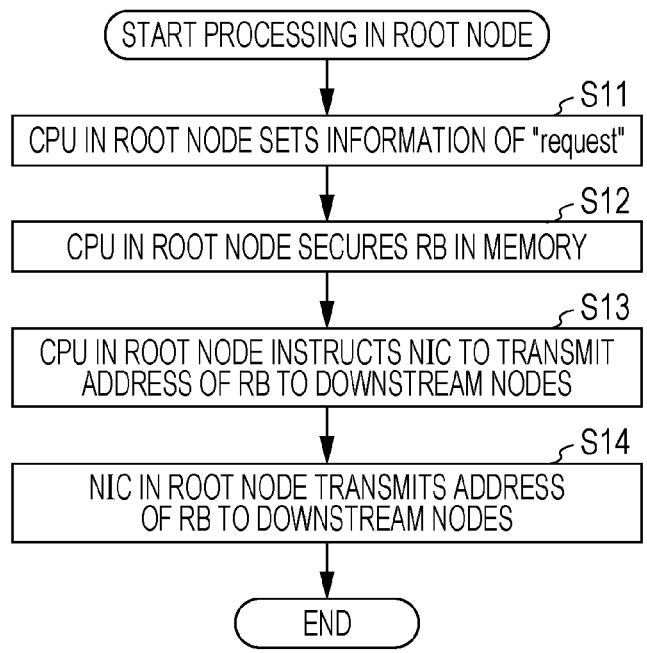
FIG. 11 is a diagram illustrating an example of an operational flowchart for a preset phase of a root node, according to an embodiment.

As illustrated in FIG. 11, in the preset phase, the CPU 21 in the root node 2a sets the information of the "request" as an initial setting (step S11). In addition, the CPU 21 (the root node processing unit 210) secures, in the memory 22, the storage area of the RB 22c for storing the result of the reduction operation (step S12).

Next, the root node processing unit 210 instructs the NIC 23 to transmit the address of the RB 22c to the downstream nodes 2 (the relay nodes 2b or the leaf nodes 2c) (step S13). In response to the instruction from the CPU 21, the NIC 23 (the root node processing unit 230) transmits the address of the RB 22c to the downstream nodes 2 (step S14), and the processing in the root node 2a in the preset phase is terminated. Note that the processing operation in the step S11 may be performed after the processing operations in the steps S12 to S14.

Figure 12:
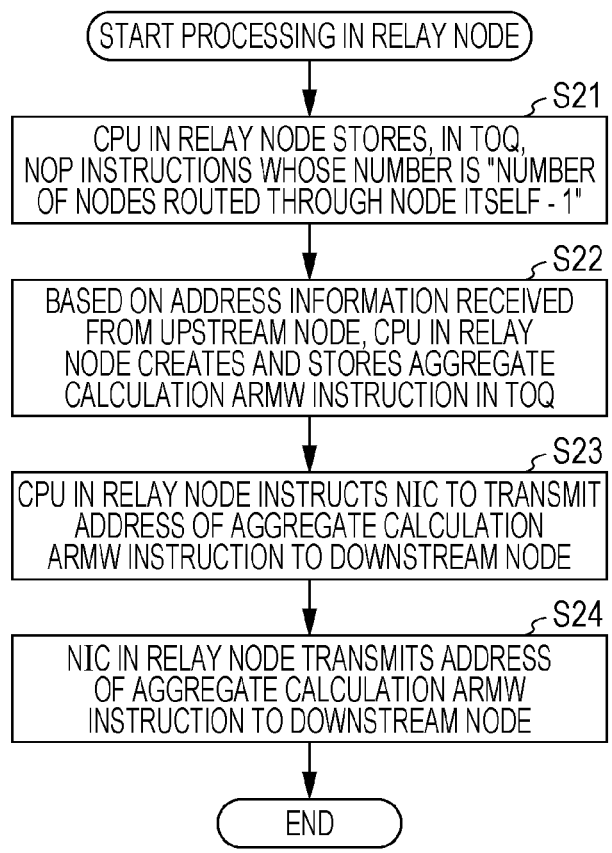
FIG. 12 is a diagram illustrating an example of an operational flowchart for a preset phase of a relay node, according to an embodiment.

In addition, as illustrated in FIG. 12, the CPU 21 (the relay node processing unit 212) in each of the relay nodes 2b creates NOP instructions whose number is "the number of nodes routed through the node 2b-1" and sets (stores) the NOP instructions in the TOQ 22a (step S21). In addition, based on information of the address, received from the corresponding upstream node 2, the relay node processing unit 212 creates an aggregate calculation ARMW instruction to be transmitted to the node serving as the relevant upstream node 2 and sets the aggregate calculation ARMW instruction in the TOQ 22a, subsequent to the NOP instructions (step S22).

Note that the relay node processing unit 212 sets the address of the RB 22c in the created aggregate calculation ARMW instruction in a case where the corresponding upstream node 2 is the root node 2a and the relay node processing unit 212 sets the address of the aggregate calculation ARMW instruction of the relevant relay node 2b in a case where the corresponding upstream node 2 is one of the relay nodes 2b. In addition, temporary data is set in the local-side area data (data for an operation) of the aggregate calculation ARMW instruction created by the relay node processing unit 212.

Next, the relay node processing unit 212 instructs the NIC 23 to transmit the address of the aggregate calculation ARMW instruction to the corresponding downstream node 2 (the corresponding relay node 2b or the corresponding leaf node 2c) (step S23). In response to the instruction from the CPU 21, the NIC 23 (the relay node processing unit 232) transmits the address of the aggregate calculation ARMW instruction to the corresponding downstream node 2 (step S24), and the processing in each of the relay nodes 2b in the preset phase is terminated.

Figure 13:
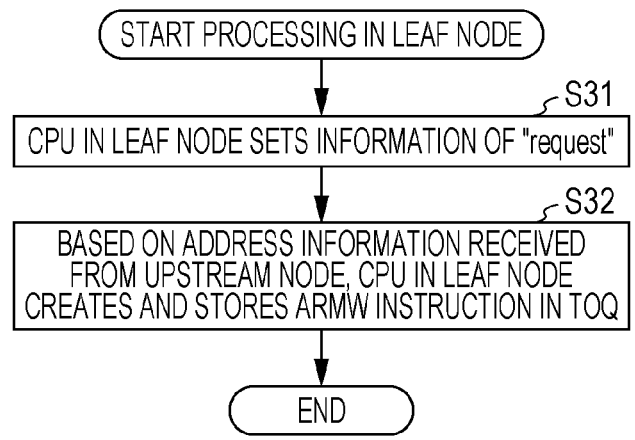
FIG. 13 is a diagram illustrating an example of an operational flowchart for a preset phase of a leaf node, according to an embodiment.

Furthermore, as illustrated in FIG. 13, the CPU 21 (the leaf node processing unit 214) in each of the leaf nodes 2c sets the information of the "request" as an initial setting (step S31). In addition, based on information of an address received from the corresponding upstream node 2, the leaf node processing unit 214 creates an ARMW instruction to be transmitted to the node serving as the relevant upstream node 2 and sets the ARMW instruction in the TOQ 22a (step S32). From the above, the processing in each of the leaf nodes 2c in the preset phase is terminated. Note that the processing operation in the step S31 may be performed after the processing operation in the step S32.

Next, processing operations of the root node 2a, the relay nodes 2b, and the leaf nodes 2c in the operation phase will be described with reference to FIG. 14 to FIG. 16.

Figure 14:
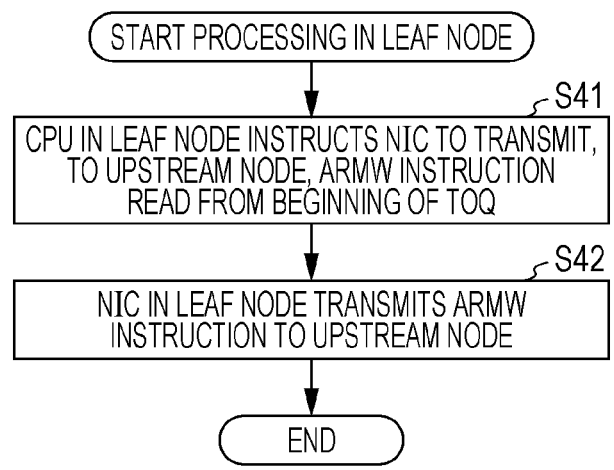
FIG. 14 is a diagram illustrating an example of an operational flowchart for an operation phase of a leaf node, according to an embodiment.

As illustrated in FIG. 14, in the operation phase, the CPU 21 (the leaf node processing unit 214) in each of the leaf nodes 2c reads the ARMW instruction stored in the beginning of the TOQ 22a and instructs the NIC 23 to transmit the read ARMW instruction to the corresponding upstream node 2 (step S41). The NIC 23 (the leaf node processing unit 234) in each of the leaf nodes 2c transmits the indicated ARMW instruction to the corresponding upstream node 2 (step S42), and the processing in each of the leaf nodes 2c in the operation phase is terminated.

Figure 15:
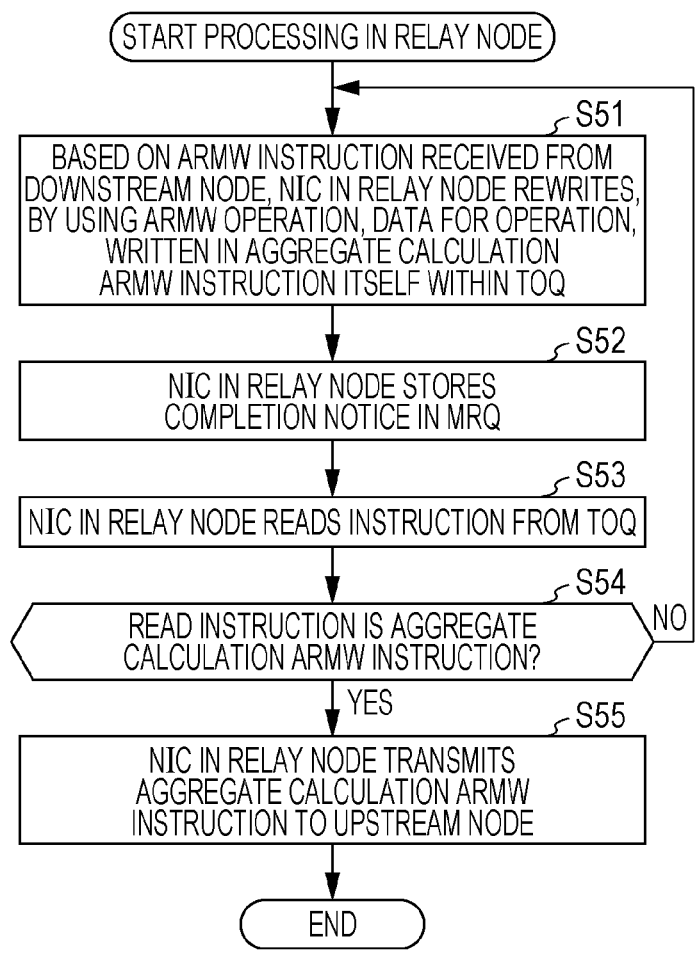
FIG. 15 is a diagram illustrating an example of an operational flowchart for a relay node, according to an embodiment.

In addition, as illustrated in FIG. 15, based on an ARMW instruction received from the corresponding downstream node 2, the NIC 23 (the relay node processing unit 232) in each of the relay nodes 2b rewrites, by using an ARMW operation, data for an operation, written in the aggregate calculation ARMW instruction within the TOQ 22a (step S51).

Next, the relay node processing unit 232 stores a completion notice in the MRQ 22b (step S52) and reads an instruction from a position indicated by the read pointer of the TOQ 22a (step S53). Depending on whether or not the read instruction is the aggregate calculation ARMW instruction, the processing is branched (step S54).

In a case where the read instruction is not the aggregate calculation ARMW instruction, in other words, is a NOP instruction (step S54: No route), the processing makes a transition to the step S51. On the other hand, in a case where the read instruction is the aggregate calculation ARMW instruction (step S54: Yes route), the relay node processing unit 232 transmits the read aggregate calculation ARMW instruction to the corresponding upstream node 2 (step S55).

In this way, based on the ARMW instruction sent by the corresponding leaf node 2c or the corresponding relay node 2b, located on a downstream side, the NIC 23 in each of the relay nodes 2b updates data for an operation, written in the aggregate calculation ARMW instruction, and reads a NOP instruction from the TOQ 22a every time an ARMW operation is completed. In a case where a final ARMW operation requested from the relevant relay node 2b is performed, an instruction remaining on the TOQ 22a dedicated to aggregate calculation ARMW in the relevant relay node 2b is only the aggregate calculation ARMW instruction. From this, in a case where the requested final ARMW operation is completed, the NIC 23 in each of the relay nodes 2b is able to transmit the aggregate calculation ARMW instruction to the corresponding upstream node 2.

From the above, the processing in each of the relay nodes 2b in the operation phase is terminated.

Figure 16:
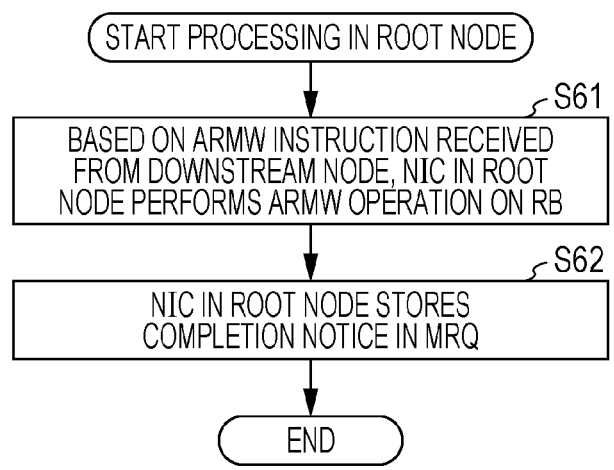
FIG. 16 is a diagram illustrating an example of an operational flowchart for an operation phase of a root node, according to an embodiment.

Furthermore, as illustrated in FIG. 16, based on an ARMW instruction received from the corresponding downstream node 2, the NIC 23 (the root node processing unit 230) in the root node 2a performs an ARMW operation on the RB 22c (step S61). In addition, the root node processing unit 230 stores a completion notice in the MRQ 22b (step S62), and the processing in the root node 2a in the operation phase is terminated.

2 Others

While a preferred embodiment of the present technology is described as above, the present technology is not limited to such a specific embodiment. The present technology may be variously modified or altered and implemented without departing from the scope of the present technology.

For example, the respective functional blocks of the CPU 21 and the NIC 23 illustrated in FIG. 3 may be combined based on arbitrary combination or may be divided.

In addition, in the above-mentioned description, each of the nodes 2 serving as the relay nodes 2b is described under assumption of including the MRQ 22b. However, in each of the relay nodes 2b, generation of the MRQ 22b may be inhibited.

Furthermore, while being described under assumption of transmitting the address of the RB 22c and the address of the aggregate calculation ARMW instruction to the corresponding downstream node 2 in the preset phase, each of the root nodes 2a and the relay nodes 2b is not limited to this. In a case where the addresses of, for example, the RB 22c and the aggregate calculation ARMW instruction are fixed values, transmission of the address information thereof may be omitted.

The above-mentioned processing base on the parallel computer system 1 may be realized by a combination of programs including, for example, the following functions.

A program executed by the CPU 21 in the relay node 2b that generates an instruction queue dedicated to aggregate calculation ARMW and an aggregate calculation ARMW instruction.

A program for the leaf node 2c that generates an ARMW instruction for rewriting an aggregate calculation ARMW instruction on the corresponding relay node 2b and that transmits the generated ARMW instruction to the corresponding relay node 2b (the corresponding upstream node 2).

A program (firmware) for the NIC 23 that suspends transmission of an aggregate calculation ARMW instruction until an operation requested by each of the leaf nodes 2c is completed and that transmits the aggregate calculation ARMW instruction to the corresponding upstream node 2 after determining completion of aggregate calculation.

Note that a program (a control program for a parallel computer) for realizing the processing based on the parallel computer system 1 is not limited to the above-mentioned combination. A control program including only at least part of the functions (node processing units) in the CPU 21 and the NIC 23 in each of the nodes 2 may be used as the control program.

Note that such a control program may be provided in a state of, for example, being stored in a computer-readable (non-transitory) recording medium.

As examples of the recording medium, a flexible disk, optical disks such as a compact disc (CD), a digital versatile disc (DVD), and a Blu-ray Disc, and flash memories, such as a Universal Serial Bus (USB) memory and an SD card, may be cited. Note that a CD-ROM, a CD-Recordable (CD-R), a CD-Rewritable (CD-RW), or the like may be cited as the CD. In addition, a DVD-ROM, a DVD-RAM, a DVD-R, a DVD-RW, a DVD+R, a DVD+RW, or the like may be cited as the DVD.

An administrator or the like of the parallel computer system 1 reads, by using a readout device, the control program stored in the recording medium and sets (installs) the control program in each of the nodes 2, thereby enabling the parallel computer system 1 to be realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer included in an information processing system to execute a process, the information processing system including a root node, one or more relay nodes, and leaf nodes, the root node being coupled to each of the leaf nodes directly or via the one or more relay nodes in a hierarchical topology, the process comprising:
   providing the leaf nodes with third data as initial values used for a predetermined operation of a non-blocking reduction operation;
   causing a processor in a first relay node of the one or more relay nodes to hold, in a queue, a first instruction for transmitting a result of performing a first portion of the predetermined operation to an upstream node that is directly coupled to the first relay node and positioned on a root-node side of the first relay node in the hierarchical topology, the first instruction being configured to include a local-side area for storing first data, the first data being updated by replacing a current value of the first data with an updated value of the first data that is obtained by performing the first portion of the predetermined operation using the current value of the first data and second data received from one or more downstream nodes that are directly coupled to the first relay node and positioned on a leaf-node side of the first relay node in the hierarchical topology;
   causing a first downstream node of the one or more downstream nodes to:
   generate a second instruction that includes a piece of the second data held in the first downstream node and is addressed to the first relay node, and
   transmit the generated second instruction to the first relay node;
   causing a network interface card of the first relay node to perform the first portion of the predetermined operation by using a piece of the second data included in the second instruction received from the first downstream node and the current value of the first data stored in the local-side area of the first instruction held in the queue, and to store, as the updated value of the first data, an intermediate value obtained by performing the first portion of the predetermined operation into the local-side area of the first instruction held in the queue; and
   causing the root node to perform a second portion of the predetermined operation by using pieces of the third data received from the leaf nodes directly coupled to the root node and pieces of the first data each of which is stored in the local-side area of the first instruction received from each of one or more connection nodes that are nodes among the one or more relay nodes directly coupled to the root node, so as to obtain a final value for the non-blocking reduction operation performed on the initial values of the third data provided for the leaf nodes.

2. The non-transitory, computer-readable recording medium of claim 1, wherein the process further comprises causing the network interface card of the first relay node to:
   suspend transmission of the first instruction until the first portion of the predetermined operation is completed for all pieces of the second data included in second instructions received from the one or more downstream nodes directly coupled to the first relay node, and
   transmit the first instruction to the upstream node when the first portion of the predetermined operation has been completed for all the pieces of the second data included in the second instructions received from the one or more downstream nodes directly coupled to the first relay node.

3. The non-transitory, computer-readable recording medium of claim 1, wherein the process further comprises causing the network interface card of the first relay node to:
   upon receiving the second instruction, read the current value of the first data stored in the local-side area of the first instruction held in the queue,
   perform the first portion of the predetermined operation by using the read current value of the first data and a piece of the second data stored in the second instruction, and
   write, as the updated value of the first data, the intermediate value obtained by performing the first portion of the predetermined operation, into the local-side area of the first instruction in the queue.

4. The non-transitory, computer-readable recording medium of claim 1, wherein the process further comprises causing the processor of the first relay node to transmit information relating to an address of the first instruction to the first downstream node via the network interface card when the first instruction is set in the queue before performing the first portion of the predetermined operation.

5. An apparatus included in an information processing system that includes a root node, one or more relay nodes, and leaf nodes, the root node being coupled to each of the leaf nodes directly or via the one or more relay nodes in a hierarchical topology, the apparatus serving as each of the one or more relay nodes, the apparatus comprising:

a queue configured to store therein a first instruction addressed to an upstream node that is directly coupled to the apparatus and positioned on a root-node side of the apparatus in the hierarchical topology, the first instruction being configured to include a local-side area for storing first data, the first data being updated by replacing a current value of the first data with an updated value of the first data that is obtained by performing a first portion of a predetermined operation using the current value of the first data and second data received from one or more downstream nodes directly coupled to the apparatus and positioned on a leaf-node side of the apparatus in the hierarchical topology;

a first processor configured to set, in the queue, the first instruction for transmitting the first data to the upstream node, before performing the first portion of the predetermined operation; and a network interface card including a second processor configured to perform the first portion of the predetermined operation by using the current value of the first data stored in the local-side area of the first instruction held in the queue, and a piece of the second data included in a second instruction received from a first downstream node of the one or more downstream nodes.

6. The apparatus of claim 5, wherein the second processor of the network interface card suspends transmission of the first instruction until the first portion of the predetermined operation is completed for all pieces of the second data included in second instructions received from the one or more downstream nodes; and the second processor of the network interface card transmits the first instruction to the upstream node when the first portion of the predetermined operation has been completed for all the pieces of the second data included in the second instructions received from the one or more downstream nodes directly coupled to the apparatus.

7. The apparatus of claim 5, wherein upon receiving the second instruction, the second processor of the network interface card:

reads the current value of the first data stored in the local-side area of the first instruction held in the queue, performs the first portion of the predetermined operation by using the read current value of the first data and a piece of the second data stored in the second instruction, and writes, as the updated value of the first data, an intermediate value obtained by performing the first portion of the predetermined operation, into the local-side area of the first instruction in the queue.

8. The apparatus of claim 5, wherein:

when the first instruction is set in the queue before performing the first portion of the predetermined operation in the apparatus, the first processor transmits information relating to an address of the first instruction to the first downstream node via the network interface card.

9. A system comprising:

leaf nodes each including a first processor and provided with third data as initial values used for a predetermined operation of a non-blocking reduction operation;

one or more relay nodes each including a second processor, the second processor of a first relay node of the one or more relay nodes being configured to store first data that is obtained by performing a first portion of a predetermined operation by using second data received from one or more downstream nodes that are directly coupled to the first relay node and positioned on a leaf-node side of the first relay node in a hierarchical topology; and a root node including a third processor and coupled to each of the leaf nodes directly or via the one or more relay nodes in the hierarchical topology, the third processor of the root node being configured to perform a second portion of the predetermined operation by using pieces of the third data received from the leaf nodes directly coupled to the root node and an intermediate value obtained by causing one or more connection nodes that are nodes among the one or more relay nodes directly coupled to the root node to perform the first portion of the predetermined operation, so as to obtain a final value for the non-blocking reduction operation performed on the initial values of the third data provided for the leaf nodes, wherein:

the second processor of a first relay node of the one or more relay nodes is configured to set, in a queue, a first instruction for transmitting an intermediate value obtained by performing the first portion of the predetermined operation to an upstream node that is directly coupled to the first relay node and positioned on a root-node side of the first relay node in the hierarchical topology, before performing the first portion of the predetermined operation, the first instruction being configured to include a local-side area for storing the first data, the first data being updated by replacing a current value of the first data with an updated value of the first data that is obtained by performing the first portion of the predetermined operation using the current value of the first data and a piece of the second data received from a first downstream node of the one or more downstream nodes directly coupled to the first relay node;

the first downstream node generates a second instruction that includes a piece of the second data held in the first downstream node and is addressed to the first relay node, and transmits the generated second instruction to the first relay node; and the first relay node further includes a network interface card configured to perform the first portion of the predetermined operation, by using a piece of the second data included in the second instruction received from the first downstream node and the current value of the first data stored in the local-side area of the first instruction.

10. The information processing system of claim 9, wherein:

the network interface card suspends transmission of the first instruction until the first portion of the predetermined operation is completed for all pieces of the second data included in all second instructions received from the one or more downstream nodes directly coupled to the first relay node; and the network interface card transmits the first instruction to the upstream node when the first portion of the predetermined operation has been completed for all the pieces of the second data included in the second instructions received from the one or more downstream nodes directly coupled to the first relay node.

11. The information processing system of claim 9, wherein:

upon receiving the second instruction, the network interface card of the first relay node:

reads the current value of the first data stored in the local-side area of the first instruction held in the queue, performs the first portion of the predetermined operation by using the second data stored in the second instruction and the current value of the first data stored in the local-side area of the first instruction, and writes, as the updated value of the first data, an intermediate value obtained by performing the first portion of the predetermined operation, into the local-side area of the first instruction in the queue.

12. The information processing system of claim 9, wherein:

the second processor of the first relay node transmits information relating to an address of the first instruction to the first downstream node via the network interface card when the first instruction is set in the queue before performing the first portion of the predetermined operation.

* * * * *